US012591899B2

(12) United States Patent
Bond et al.

(10) Patent No.: US 12,591,899 B2
(45) Date of Patent: *Mar. 31, 2026

(54) CASINO PATRON ENGAGEMENT SYSTEM

(71) Applicant: IGT, Las Vegas, NV (US)

(72) Inventors: Eugene Bond, Trabuco Canyon, CA (US); Gandalf Hudlow, San Marcos, CA (US); Jie Zhou, Beijing (CN); Lu Zhao, Beijing (CN); Wei Yan, Beijing (CN); Wei Gong, Beijing (CN); Sina Miri, Menlo Park, CA (US); John E. Burden, Las Vegas, NV (US)

(73) Assignee: IGT, Las Vegas, NV (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/440,056

(22) Filed: Feb. 13, 2024

(65) Prior Publication Data

US 2024/0185263 A1     Jun. 6, 2024

Related U.S. Application Data

(63) Continuation of application No. 17/062,793, filed on Oct. 5, 2020, now Pat. No. 11,935,074, which is a continuation of application No. 15/672,863, filed on Aug. 9, 2017, now abandoned.

(60) Provisional application No. 62/377,967, filed on Aug. 22, 2016.

(51) Int. Cl.
*G06Q 30/02*          (2023.01)
*G07F 17/32*          (2006.01)

(52) U.S. Cl.
CPC ......... *G06Q 30/02* (2013.01); *G07F 17/3223* (2013.01); *G07F 17/3225* (2013.01); *G07F*

17/3234 (2013.01); *G07F 17/3239* (2013.01); *G07F 17/3255* (2013.01)

(58) Field of Classification Search
USPC ....................................................... 705/7.15
See application file for complete search history.

(56) References Cited

U.S. PATENT DOCUMENTS

| | | | |
|---|---|---|---|
| 6,923,724 | B2 | 8/2005 | Williams |
| 7,316,619 | B2 | 1/2008 | Nelson |
| 8,073,657 | B2 | 12/2011 | Moore et al. |
| 8,147,340 | B2 | 4/2012 | Brunet et al. |
| 8,249,835 | B2 | 8/2012 | Moore et al. |
| 8,460,090 | B1 | 6/2013 | Gilliland |
| 8,738,036 | B1 | 5/2014 | Boyle et al. |

(Continued)

FOREIGN PATENT DOCUMENTS

| | | | | |
|---|---|---|---|---|
| CN | 101156182 | A | 4/2008 | |
| KR | 20160117530 | A | * 10/2016 | ........... G07F 17/323 |

OTHER PUBLICATIONS

Auer, Michael. Behavioural tracking and the effects of responsible gaming tools and personalized feedback in online gambling. Nottingham Trent University (United Kingdom), 2015 (Year: 2015).*

(Continued)

*Primary Examiner* — Kristin E Gavin
(74) *Attorney, Agent, or Firm* — Neal, Gerber & Eisenberg LLP

(57)          ABSTRACT

Various embodiments of the present disclosure provide a casino patron engagement system that facilitates engagement among casino employees and casino patrons to engender patron loyalty.

20 Claims, 18 Drawing Sheets

(56) References Cited

U.S. PATENT DOCUMENTS

| | | | |
|---|---|---|---|
| 8,758,102 B2 | 6/2014 | Block et al. | |
| 8,784,190 B2 | 7/2014 | Thompson et al. | |
| 8,801,517 B2 | 8/2014 | Walker et al. | |
| 8,870,657 B2 | 10/2014 | Nelson | |
| 9,180,362 B2 * | 11/2015 | Herrman | G07F 17/32 |
| 9,418,115 B2 | 8/2016 | Ganick et al. | |
| 9,536,390 B2 | 1/2017 | Ehrlich et al. | |
| 9,626,826 B2 | 4/2017 | Nguyen | |
| 9,875,499 B2 | 1/2018 | Washington et al. | |
| 10,055,803 B2 | 8/2018 | Orduna et al. | |
| 10,699,520 B2 * | 6/2020 | Bytnar | G07F 17/3237 |
| 2004/0143496 A1 | 7/2004 | Saenz | |
| 2006/0111089 A1 | 5/2006 | Winter et al. | |
| 2006/0252530 A1 | 11/2006 | Oberberger et al. | |
| 2007/0117623 A1 * | 5/2007 | Nelson | G06Q 30/02 |
| | | | 463/29 |
| 2007/0174390 A1 | 7/2007 | Silvain et al. | |
| 2007/0243928 A1 | 10/2007 | Iddings | |
| 2008/0004996 A1 * | 1/2008 | Kuehling | G06Q 10/087 |
| | | | 705/28 |
| 2008/0058105 A1 | 3/2008 | Combs et al. | |
| 2009/0036188 A1 | 2/2009 | Gelman | |
| 2009/0055204 A1 * | 2/2009 | Pennington | G07F 17/3241 |
| | | | 348/169 |
| 2009/0069090 A1 | 3/2009 | Moser et al. | |
| 2009/0197684 A1 | 8/2009 | Arezina et al. | |
| 2010/0113161 A1 | 5/2010 | Walker et al. | |
| 2010/0211431 A1 * | 8/2010 | Lutnick | G06Q 30/0255 |
| | | | 705/14.1 |
| 2011/0045908 A1 | 2/2011 | Ehrlich et al. | |
| 2011/0183732 A1 * | 7/2011 | Block | G06Q 50/34 |
| | | | 463/1 |
| 2011/0306400 A1 | 12/2011 | Nguyen | |
| 2013/0084973 A1 | 4/2013 | Frady | |
| 2014/0295944 A1 * | 10/2014 | Faircloth | G07F 17/3255 |
| | | | 463/25 |
| 2014/0370989 A1 * | 12/2014 | Acres | G07F 17/3232 |
| | | | 463/42 |
| 2015/0112745 A1 | 4/2015 | Wang et al. | |
| 2016/0093135 A1 | 3/2016 | Bond et al. | |
| 2017/0061442 A1 * | 3/2017 | Barlow | G06Q 30/016 |
| 2017/0169660 A1 | 6/2017 | Boudreau et al. | |
| 2017/0186270 A1 | 6/2017 | Acres | |

OTHER PUBLICATIONS

"Examination Report No. 1", from corresponding Australian Patent Application No. 2017216498, Jul. 29, 2022.

Shi, Yongdong, et al., "Linking service quality, customer satisfaction and loyalty in casinos, does membership matter?", International Journal of Hospitality Management 40 (2014): 81-91. (Year: 2014).

* cited by examiner

1000

2000a

2154

2152

2120

2122

2140

2150

2130

2136

2116

2138

2150

2126

2128

2132

2134

2130

CASINO PATRON ENGAGEMENT SYSTEM

PRIORITY

This application is a continuation of, claims priority to and the benefit of U.S. patent application Ser. No. 17/062, 793, filed on Oct. 5, 2020, which application is a continuation of, claims priority to and the benefit of U.S. patent application Ser. No. 15/672,863, filed on Aug. 9, 2017, now abandoned, which application claims priority to and the benefit of U.S. Provisional Patent Application No. 62/377, 967, filed on Aug. 22, 2016, now expired, the entire contents of each of which are incorporated herein by reference.

BACKGROUND

A typical gaming establishment such as a casino routinely offers patron-engagement promotions and engages in certain patron-engagement activities to attract new patrons to visit the casino and to engender patron loyalty to retain patrons who've already visited.

There is a continuing need for new and improved casino patron engagement systems that solve these problems.

SUMMARY

Various embodiments of the present disclosure provide a casino patron engagement system that facilitates engagement among casino employees and casino patrons to engender patron loyalty.

In various embodiments, the casino patron engagement system includes various combinations of: (1) a casino management system; (2) a data analysis module; (3) a message broker; (4) a patron profile module; (5) a patron engagement campaign management module; (6) a request management module; (7) a location module; (8) a patron intervention campaign management module; and (9) a server, configured to interact with a plurality of electronic gaming machines (EGMs), a plurality of employee mobile devices, and a plurality of patron mobile devices.

In various other embodiments, the casino patron engagement system includes a patron engagement campaign management module configured to, responsive to an occurrence of a patron engagement campaign initialization event for a first casino patron, initialize a patron engagement campaign for the first casino patron and assign a first one of a plurality of casino employees an engagement task of the patron engagement campaign based at least in part on a location of the first casino employee; and a patron intervention campaign management module configured to, responsive to an occurrence of a patron intervention campaign initialization event for a second casino patron based on an estimated emotional state of the second casino patron, initialize a patron intervention campaign for the second casino patron and assign a second one of the plurality of casino employees an intervention task of the patron intervention campaign.

In various other embodiments, the casino patron engagement system includes a server configured to securely communicate with a casino employee mobile device, wherein the casino employee mobile device is loaded with an employee application and configured to search for a casino patron mobile profile beacon that is outputted by a casino patron mobile device of a casino patron, wherein the casino patron mobile device is loaded with a casino mobile patron profile application and configured to output the patron mobile profile beacon. The server is further configured to receive from the casino employee mobile device profile ID data that is obtained by the casino employee mobile device as a result of detecting the patron mobile profile beacon outputted by the casino patron mobile device. The server is further configured to, responsive to receipt of the profile ID data from the employee mobile device, send to the employee mobile device patron profile data associated with profile ID data, wherein the patron profile data enables the employee application to cause a display device of the employee mobile device to display patron profile information in association with proximity information received from mobile profile beacon to enable the employee to have information for interaction with the casino patron.

Additional features and advantages are described herein, and will be apparent from, the following Detailed Description and the Figures.

DETAILED DESCRIPTION

Figure 1:
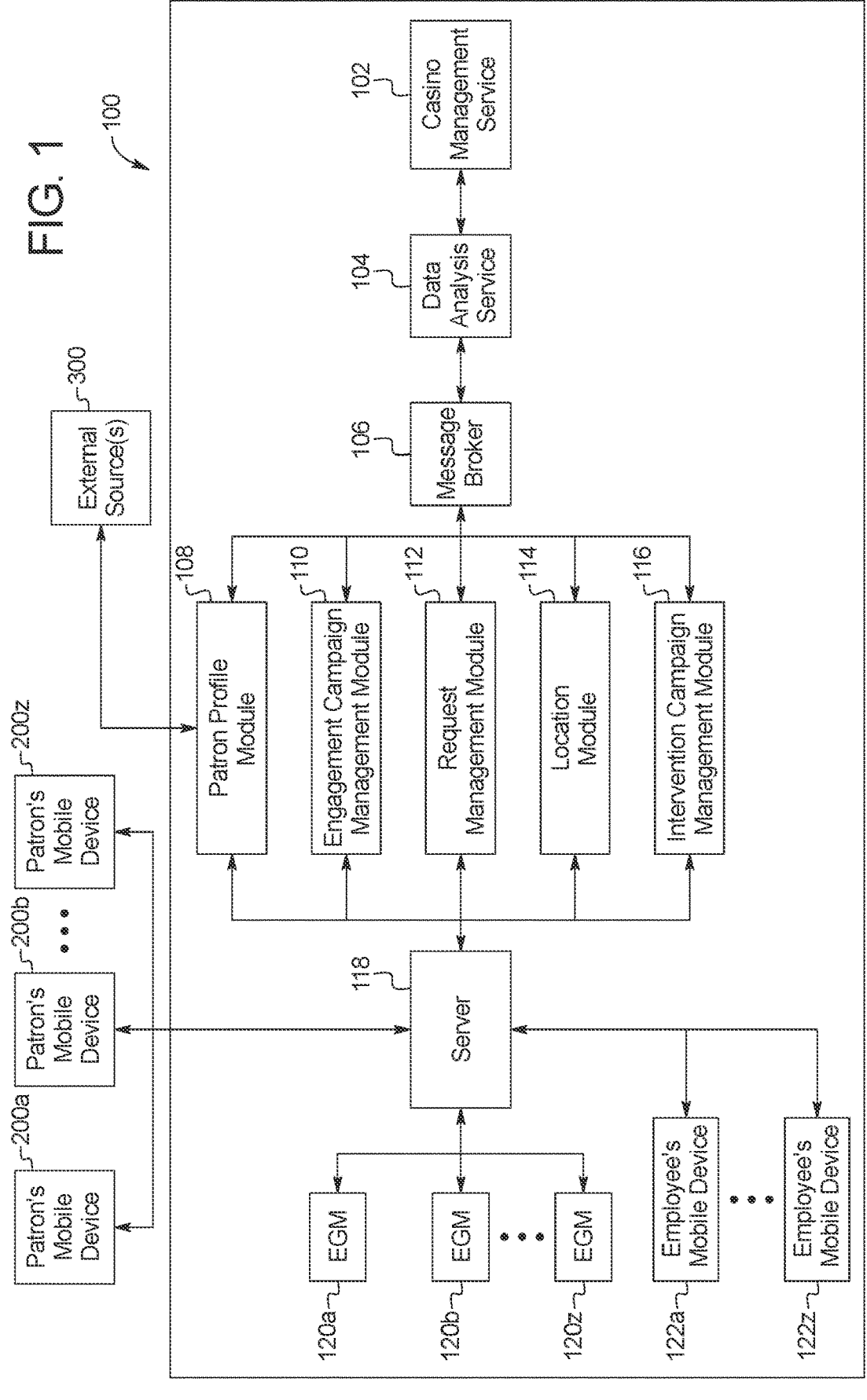
FIG. 1 is a block diagram of one example embodiment of the casino patron engagement system of the present disclosure.

To better understand the present disclosure and its benefits, a brief description of various known patron-engagement mechanisms is provided below.

One known type of patron-engagement promotion involves a casino providing, without charge, patrons (or potential patrons) with monetary value, an item representing monetary value, or a free attempt to win monetary value or an item representing a monetary value. One such known promotion involves the casino sending people vouchers for free game play at the casino, such as a voucher one can redeem for $10 of free play at a video poker gaming machine. Another such known promotion involves the casino sending people vouchers for free food or drink at the casino, such as a voucher for two free drinks at one of casino's bars or restaurants. Another such known promotion involves the casino offering a free drawing with casino-funded prizes, such as a weekly drawing with a casino-funded $100 grand prize. Another such known promotion involves the casino providing a patron promotional credits based on the patron's game play at the casino. The patron can use these promotional credits for free game play. Another such known promotion involves the casino accumulating points for the player (such as based on game play) and enabling the player to exchange the points for valuable items, such as merchandise or services.

These known patron-engagement promotions are problematic because they cost the casinos money, which eats into the casinos' operational margins and budgets. Fierce competition between casinos compounds this problem. As casinos offer better and better promotions to try to attract patrons, the costs of these promotions to the casinos skyrocket.

Another known type of patron-engagement activity involves a human dispatcher assigning casino employees to engage certain patrons, such as VIP patrons, when certain patron-engagement events occur. For instance, when a patron-engagement event occurs for one of these patrons-such as the patron arriving at the casino and inserting her player tracking card into an electronic gaming machine ("EGM") or the patron losing a specified amount of money at an EGM-a human dispatcher must recognize this patron-engagement event and alert the assigned employee-host. The assigned employee-host can then walk to the patron to greet the patron.

This known type of patron-engagement activity is problematic for a variety of reasons. Using human dispatchers introduces human error into the process. For instance, the dispatcher may simply miss patron-engagement events that occur. Compounding this is the fact that thousands or tens of thousands of people may visit a casino in a particular day. It is extremely difficult if not impossible for human dispatchers to accurately monitor the numerous transactions, game play, and other events that occur for these players for the occurrence of patron-engagement events. Compounding this is the fact that the casino may lose its chance to engage patrons if patron-engagement events aren't recognized in a timely fashion. For instance, if a patron loses $500 at an EGM—which is an example of a patron-engagement event—and it takes a dispatcher 25 minutes to recognize this and dispatch an employee to greet the patron, it's certainly likely that the patron has already left the casino. In another example, if a VIP patron arrives at the casino and sits at a high-limit blackjack table—which is another example of a patron-engagement event—and it takes a dispatcher 45 minutes to recognize this and dispatch an employee to greet the patron, the VIP patron may already have a bad taste in his or her mouth and feel underappreciated since it took so long for the casino to welcome him or her.

Not to mention using human dispatchers is also labor intensive—the casino must employ enough dispatchers to deal with thousands or tens of thousands of patrons for an around-the-clock operation. Even if the casino employs enough human dispatchers, it is difficult if not technically impossible for the dispatchers to coordinate tens or hundreds of casino employees (or contractors or other service providers) in response to hundreds or thousands of daily patron-engagement events. Unless there is a constant line of communication between each dispatcher and each casino employee—which is practically impossible for all intents and purposes—the dispatchers do not know exactly where in the casino each of the casino employees are located or what each of the casino employees are doing at any particular point in time.

Adding to the above problems is the fact that patron-engagement promotions and activities are usually segmented within the casino into diverse operational silos. These silos typically operate independently so one doesn't know what the other is doing, and vice-versa. The casino therefore often lacks continuity in its plan to attract new patrons and retain its current patrons.

Further, the above-described customer-engagement promotions and activities generally don't effectively attract, motivate, or retain Millennial patrons. This is especially problematic given that the Millennial generation is the largest in U.S. history as well as significant in foreign countries, and its spending power keeps growing.

Various embodiments of the present disclosure provide a technical solution to these problems by providing an automated casino patron engagement system that facilitates engagement among casino employees and casino patrons to engender patron loyalty.

In various embodiments, the casino patron engagement system includes or provides an automated patron engagement campaign management module configured to manage, assign, and monitor patron engagement campaigns in real time. Patron engagement campaigns facilitate and coordinate interaction between casino employees and high-value casino patrons by electronically instructing casino employees to perform one or more engagement tasks with, for, or otherwise related to those high-value patrons. For example, when a patron whose coin-in at an EGM is typically more than $500 cards-in to an EGM at the casino, when a patron visits the casino on her birthday, when a patron visits the casino for the first time, when a patron wins a jackpot, when a VIP patron visits the casino, and/or when a patron experiences a large loss at an EGM, the patron engagement campaign management module may automatically initialize a patron-engagement campaign and automatically select and assign in real time one or multiple employees to conduct the patron-engagement campaign by performing different engagement tasks in association with that patron.

In certain embodiments, the casino patron engagement system includes a patron intervention campaign management module configured to manage, assign, and monitor patron intervention campaigns. Patron intervention campaigns encourage casino employees to interact with casino patrons who are predicted based on data analysis to be unhappy, agitated, or inclined to leave the casino (based on one or more determinations by the patron intervention campaign management module) by instructing casino employees to perform one or more intervention tasks with, for, or otherwise related to those patrons to remediate the patron's negative experiences. For instance, when the estimated emotional state of a patron carded-in at an EGM falls below a threshold level (e.g., the patron is predicted to be unhappy based on data analysis), the patron intervention campaign management module may automatically initialize a patron intervention campaign and automatically select and assign an employee to conduct the patron-engagement campaign.

The casino patron engagement system of various embodiments of the present disclosure manages employee assignments via applications installed on employees' mobile devices. The application installed on each mobile device enables the above-described campaign management systems to communicate task assignments directly to the employees in real-time. The application also enables employees to communicate with the other hardware and modules of the casino patron engagement system, such as to provide patron emotional state estimate data, to actively seek out and accept tasks for active campaigns, and/or to manually create campaigns or engagement tasks.

The casino patron engagement system of various embodiments of the present disclosure provides a technical solution to solve the above-described problems. In certain embodiments, the casino patron engagement system encourages interaction between employees and patrons without any monetary outlay by the casino. In other words, the casino patron engagement system facilitates patron retention via engagement, not providing monetary value. This saves the casino money by foregoing costly monetary promotions and avoiding competition with other casinos. Alternatively, the casino patron engagement system encourages interaction between employees and patrons with some monetary outlay by the casino, but less than the casino would otherwise outlay without employee-patron interaction. This also saves the casino money.

Also, the use of the employee application encourages employees to take advantage of the many opportunities to interact with patrons by providing on-demand information regarding patrons' moods and unassigned tasks that must be completed for patrons. It also encourages different employees to interact with different patrons, and doesn't simply assign particular employees to particular patrons in perpetuity or extended periods of time.

In various embodiments, the casino patron engagement system does not employ human dispatchers, and thus avoids the human error caused by human dispatchers, and reduces various associated labor costs. The casino patron engagement system also seamlessly communicates with hundreds or thousands of EGMs and mobile devices (both employee and patron in certain embodiments) to recognize when patron-engagement events occur in real time and to dynamically select and assign in real time employees to conduct campaigns in response to those events.

The casino patron engagement system of various embodiments of the present disclosure thus provides one cohesive or integrated system usable to coordinate substantial patron engagement throughout the casino, which avoids the problem of several different patron engagement teams working independently of one another.

The present disclosure is described in further detail below where the numbered headings are included for clarity, and do not limit the scope of the present disclosure.

1. Hardware and Modules

FIG. 1 is a block diagram of one example embodiment of the casino patron engagement system of the present disclosure. The casino patron engagement system 100 includes: (1) a casino management system 102; (2) a data analysis module 104; (3) a message broker 106; (4) a patron profile module 108; (5) a patron engagement campaign management module 110; (6) a request management module 112; (7) a location module 114; (8) a patron intervention campaign management module 116; (9) a server 118; (10) a plurality of electronic gaming machines (EGMs) 120*a*, 120*b*, . . . 120*z*; and (11) a plurality of employee mobile devices 122*a* . . . 122*z*. In certain embodiments, the casino management system is not part of the casino patron engagement system, but is configured to communicate with the casino patron engagement system.

The casino management system 102 is communicatively connected to the data analysis module 104 via a suitable electronic network.

The data analysis module 104 is communicatively connected to the message broker 106 via a suitable electronic network.

The message broker 106 is communicatively connected to the patron profile module 108, the patron engagement campaign management module 110, the request management module 112, the location module 114, and the patron intervention campaign management module 116 via a suitable electronic network to enable these components to communicate with one another.

The patron profile module 108 is communicatively connectable to one or more external data sources 300, such as social networking websites, via a suitable electronic network.

The server 118 is communicatively connected to: (1) the patron profile module 108, the patron engagement campaign management module 110, the request management module 112, the location module 114, and the patron intervention campaign management module 116 via a suitable electronic network (such as via the message broker 106); (2) the EGMs 120*a*, 120*b*, . . . 120*z* via a suitable electronic network (such as via a Representational State Transfer (REST) Application Programming Interface (API)); and (3) the employee mobile devices 122*a* . . . 122*z* via a suitable electronic network (such as via a REST API).

The server 118 is also communicatively connectable to a plurality of patron mobile devices 200*a*, 200*b*, . . . 200*z* via a suitable electronic network. The patron mobile devices 200 may be any suitable mobile devices configured to wirelessly communicate with the server 118, such as (but not limited to) a mobile phone (e.g., a smart phone, such as the one described below with respect to FIG. 3), a tablet computing device, a personal digital assistant, a wearable computing device (such as a smartwatch), or a laptop computer.

The electronic network(s) that the hardware and modules use to communicate with one another may be any suitable network(s), such as (but not limited to) the Internet, a local area network, a wide area network, a cellular network, or any other suitable wired or wireless network. Also, the hardware and modules may use any suitable quantity of networks to communicate with one another. For instance, certain hardware/modules may communicate via the Internet while others communicate via a local area network. Further, although not shown in FIG. 1, in various embodiments, any suitable hardware or module of the casino patron engagement system may communicate directly or indirectly with any other suitable hardware or module of the casino patron engagement system.

Although the hardware and modules are shown in FIG. 1 as distinct entities, two or more may be combined and used to carry out the various functionalities of the casino patron engagement system.

1.1 Casino Management System

The casino management system 102 is configured to manage casino floor operation, as is known in the art. For instance, the casino management system 102 may implement or host one or more of the following: (1) casino bonusing, promotions, and sweepstakes; (2) patron management and tracking; (3) EGM accounting, including ticket-in-ticket-out tracking and cashless gaming; (4) mobile applications; (5) visual EGM performance maps (e.g., interactive maps of the casino floor showing the location and status of EGMs); (6) cage and table accounting; (7) comp awards and tracking; (8) junket tracking; and (9) marketing. One known casino management system is the IGT ADVANTAGE system (IGT ADVANTAGE is a registered trademark of IGT Corporation).

Although not shown here for clarity, the casino management system may communicatively connect with any suitable hardware or modules of the casino patron engagement system (e.g., the EGMs) to enable the casino management system to carry out any of its functions.

1.2 Data Analysis Module

The data analysis module 104 is a web-based service configured to: (1) access (or receive) data from different hardware and/or modules of the casino patron engagement system 100 (including from the casino management system 102); (2) analyze that data; and (3) publish the analysis results (and/or any other suitable resultant data) to the message broker 106 so other modules and hardware of the casino patron engagement system 100 can access the analysis results (or resultant data). For a particular patron, the data analysis module 104 is configured to access (or receive) data associated with that patron stored in a database (such as historical data stored in a database maintained by the casino management system 102) and/or to receive real-time or nearly real-time data associated with that patron (such as real-time or nearly real-time game play data). The data may include any suitable data such as, but not limited to:

(1) demographic data, such as (but not limited to): the patron's player tracking account number, the patron's player tracking card number, the patron's name, patron's player tracking ranking or level, any promotional status associated with the patron, the patron's address, the patron's birthday, the patron's income level, the patron's marital status, the patron's occupation, the patron's employer, the patron's interest(s), the patron's preference(s), the patron's gender, and/or the patron's level of education;

(2) game play data, such as (but not limited to): cumulative amount of coin-in, amount of coin-in for each gaming session, average amount of coin-in per gaming session, amount of coin-in for current gaming session, cumulative amount of coin-out, amount of coin-out for each gaming session, average amount of coin-out per gaming session, cumulative gaming length, length of each gaming session, average gaming session length, current gaming session length, the outcomes of each game play of each gaming session, the cumulative amount of money deposited across all gaming sessions, the amount of money deposited for each gaming session, the average amount of money deposited per gaming session, the amount of money deposited for the current gaming session, a cumulative amount of money won (or lost) across all gaming sessions, the amount of money won (or lost) for each gaming session, the average amount of money won (or lost) per gaming session, the amount of money won (or lost) in the current gaming session, a cumulative amount of winning outcomes achieved across all gaming sessions, the amount of winning outcomes achieved for each gaming session, the average amount of winning outcomes achieved per gaming session, the amount of winning outcomes achieved in the current gaming session, a cumulative amount of losing outcomes achieved across all gaming sessions, the amount of losing outcomes achieved for each gaming session, the average amount of losing outcomes achieved per gaming session, the amount of losing outcomes achieved in the current gaming session, the patron's current credit balance, and/or the patron's game play behavior patterns (e.g., how frequently the patron plays and how much the patron bets);

(3) sensor data received from any suitable sensor(s), such as (but not limited to): motion sensors configured to sense motion of a patron (such as a patron playing an EGM), eye tracking sensors configured to track the direction of a patron's gaze (such as a patron playing an EGM), weight sensors configured to sense whether a patron is sitting in a chair of an EGM, the force at which the patron presses the EGM buttons or touch screen, the speed at which the patron provides inputs to the EGM, and/or location data (e.g., GPS data);

(4) publicly available externally sourced data, such as (but not limited to): the patron's connections in a social network, the patron's likes and dislikes, the patron's online presence, the patron's RSS feed, the patron's blog posts, the patron's comments posted to websites, and/or any other publicly available information from the patron obtainable from the Internet;

(5) data received from employee mobile devices, such as (but not limited to): patron emotional state estimate data, employee-provided comments related the patron, and/or employee chats with the patron;

(6) data received from EGMs, such as (but not limited to): patron survey results and/or game play data of the patron (e.g., that stored by the casino management system 102); and/or (7) data received from patron mobile devices, such as (but not limited to): patron survey results, patron comments, and/or patron location data.

The data analysis module 104 is configured to analyze some or all of this data and generate one or more of: a campaign opportunity event (e.g., an engagement or intervention event); patron characteristics; patron persona (e.g., user type including behavior pattern, skills, goals, attitudes, and the like); patron estimated emotional state data (e.g., as described below for the patron profile module 108 both the data analysis module 104 and the patron profile module 108 may update the patron estimated emotional state data); patron physical status (e.g., location); patron win/loss (e.g., whether the patron is winning or losing (and how much) over a designated period of time such as during her visit to the casino); patron special event (e.g., patron's birthday, patron's jackpot win, patron's first visit of the year); patron asset status (e.g., the patron's credit balance, current quantity (or cash value) of chips, or the patron's account balance); and patron behavior forecast (e.g., patron is predicted to leave in 30 minutes or after his credit balance reaches 0 credits).

While in this example embodiment the data analysis module 104 is a web-based service, in other embodiments the system includes certain hardware, such as one or more servers, configured to carry out the functionality of the data analysis module 104.

1.3 Message Broker

The message broker 106 is a suitable service or a suitable server (or other hardware) configured to facilitate electronic message and data transfer among the different hardware and modules of the casino patron engagement system 100 (including the casino management system 102). For instance, the message broker 106 may operate a publish/subscribe service, such as that described in U.S. Patent Application Publication No. 2014/0155173, the entire contents of which are incorporated herein by reference.

1.4 Patron Profile Module

The patron profile module 108 is a web-based service configured to: (1) receive or access the analysis results (or other resultant data) from the data analysis module 104 and data obtained by the external source(s) 300 (and sometimes the casino management system 102); (2) create, update, and maintain a profile for each patron based on the received data; and (3) publish the patron profiles to the message broker 106 so other modules and hardware of the casino patron engagement system 100 can access the patron profiles.

Each patron profile includes estimated emotional state data for the corresponding patron. The estimated emotional state data reflects the patron's estimated emotional state or mood (e.g., happy, unhappy, or indifferent). The patron profile module 108 is configured to determine the estimated emotional state data using one or more of the data received from the data analysis module 104, such as player win/loss data, player play pattern data (e.g., frequency of switching EGMs or bet frequency), employee input/comment data for the player, or player input data. Certain example manners of determining the estimated emotional state data are described in U.S. Pat. No. 8,460,090, the entire contents of which are incorporated herein by reference. In certain embodiments, the estimated emotional state data is a number from 0 to 10 (or on any other suitable scale), with 10 reflecting completely happy and 0 reflecting completely unhappy. In certain embodiments, the patron profile module 108 is configured to publish the estimated emotional state data for the patrons to the message broker 106 separate from the patron profiles so other modules and hardware of the casino patron engagement system 100 can access the estimated emotional state data independent from the patron profiles.

A patron profile may include, among other things: (1) an image of the patron; (2) the patron's name; (3) the patron's location in the casino; (4) the patron's estimated emotional state data; (5) any active campaigns for the patron (described below); (6) any active service requests for the patron; (7) patron characteristics; (8) patron persona; (9) patron special event; and/or (10) patron asset status (e.g., rich, poor, generous, stingy).

While in this example embodiment the patron profile module 108 is a web-based service, in other embodiments the system includes certain hardware, such as one or more servers, configured to carry out the functionality of the patron profile module 108.

1.5 Patron Engagement Campaign Management Module and Patron Intervention Campaign Management Module The patron engagement campaign management module 110 is a web-based service configured to electronically manage, assign, and monitor patron engagement campaigns. Patron engagement campaigns facilitate interaction between casino employees and high-value casino patrons by instructing casino employees to physically perform one or more engagement tasks with, for, or otherwise related to those high-value patrons. The patron engagement campaign management module 110 stores or is configured to access a patron engagement campaign database that stores a plurality of different patron engagement campaigns and corresponding patron engagement campaign initialization events. To determine whether to initialize a patron engagement campaign, the patron engagement campaign management module 110: (1) receives data from one or more modules or hardware of the casino patron engagement system 100—in this example embodiment, the data analysis module 104, the patron profile module 108, and the location module 114; and (2) determines whether any of the patron engagement campaign initialization events occur based on the received data. If so, the patron engagement campaign management module 110 automatically initializes the corresponding patron engagement campaign.

The patron intervention campaign management module 116 is a web-based service configured to manage, assign, and monitor patron intervention campaigns. Patron intervention campaigns facilitate interaction between casino employees and casino patrons who are unhappy, agitated, or inclined to leave the casino by instructing casino employees to perform one or more intervention tasks with, for, or otherwise related to those patrons to remediate the patron's negative experiences. The patron intervention campaign management module 116 stores or is configured to access a patron intervention campaign database that stores a plurality of different patron intervention campaigns and corresponding patron intervention campaign initialization events. To determine whether to initialize a patron intervention campaign, the patron intervention campaign management module 116: (1) receives data from one or more modules or hardware of the casino patron engagement system 100—in this example embodiment, the data analysis module 104, the patron profile module 108, and the location module 114; and (2) determines whether any of the patron intervention campaign initialization events occur based on the received data. If so, the patron intervention campaign management module 116 automatically initializes the corresponding patron intervention campaign.

The patron engagement campaigns and patron intervention campaigns are collectively referred to herein as "campaigns" for brevity.

Each campaign is associated with: (1) an initialization event or events that must occur to initialize the campaign; (2) a priority that indicates how important the campaign is relative to other campaigns (and enables the casino patron engagement system to prioritize assignment and completion of certain campaigns over others); (3) roles for different employees; (4) tasks that must be completed to complete the campaign; (5) a task schedule indicating the desired time to complete a task and/or the order in which tasks should be completed; and (6) visibility rules defining which employees can see a task and accept the task.

Some example campaign initialization events include (but are not limited to): a patron with an average coin-in above a threshold cards in at an EGM; a patron with an average coin-in above a threshold arrives at the casino; a patron wins a particular award (e.g., a jackpot); a patron wins more than a threshold amount during a gaming session; a patron loses more than a threshold amount during a gaming session; a patron wins more than average during a gaming session; a patron loses more than average during a gaming session; a patron is likely to leave the casino or terminate a gaming session (certain manners of determining whether a patron is likely to terminate a gaming session are described in U.S. Pat. No. 8,834,261, the entire contents of which are incorporated herein by reference); a patron is likely to cash-out of an EGM; a patron's estimated emotional state falls below a threshold; a patron's estimated emotional state rises above a threshold; a patron's gaming session exceeds a threshold; a particular time of day arrives; a patron visits the casino of a particular day (e.g., the patron's birthday); a patron is on a winning streak of threshold length; a patron is on a losing streak of a threshold length; a patron is located within a designated vicinity of one or more employees; a patron has visited the casino at least a threshold quantity of times within a particular time period (e.g., twice in one week); a patron averages one visit to the casino per a particular time period (e.g., once a week); a patron is upset due to bad casino service; a patron's wedding anniversary; and/or a special holiday for the patron (e.g., Christmas).

Some example campaign physical tasks include (but are not limited to): greeting the patron, wishing the patron a happy birthday, welcoming the patron back to the casino, offering the patron complimentary food or drink, offering to escort the patron to a desired EGM or table game (such as her favorite EGM or the favorite blackjack table), offering the patron a coupon, offering the patron a comp (such as a free meal at a restaurant in the casino), offering the patron a free play voucher, offering a photography service, and/or offering the patron a celebration service.

Table 1 below includes some example campaigns and their corresponding campaign initialization events and tasks.

| Campaign | Initialization Event(s) | Task(s) |
|---|---|---|
| Welcome | Patron who historically averages $200+ coin-in per gaming session cards in at an EGM | In-person greeting |
| VIP Welcome | Patron who historically averages $1,000+ coin-in per gaming session cards in at an EGM | In-person greeting Buffet comp |
| Whale Welcome | Patron who historically averages $10,000+ coin-in per gaming session cards in at an EGM | In-person greeting Steakhouse comp Hotel room comp |
| Big Win | Patron wins $1,000+ at an EGM | In-person greeting Photography service Celebration service Hotel room comp |
| Losing Session | Patron loses $500+ during a gaming session | In-person greeting Buffet comp |
| Long Session | Patron's gaming session exceeds 4 hours | In-person greeting Hotel room comp |
| Retention | Patron who historically cashes out after $100 coin-in reaches $90 coin-in | In-person greeting $10 free play voucher |
| Unhappy Patron | Patron's estimated emotional state falls below 50% | In-person greeting Buffet comp |

Figure 7:
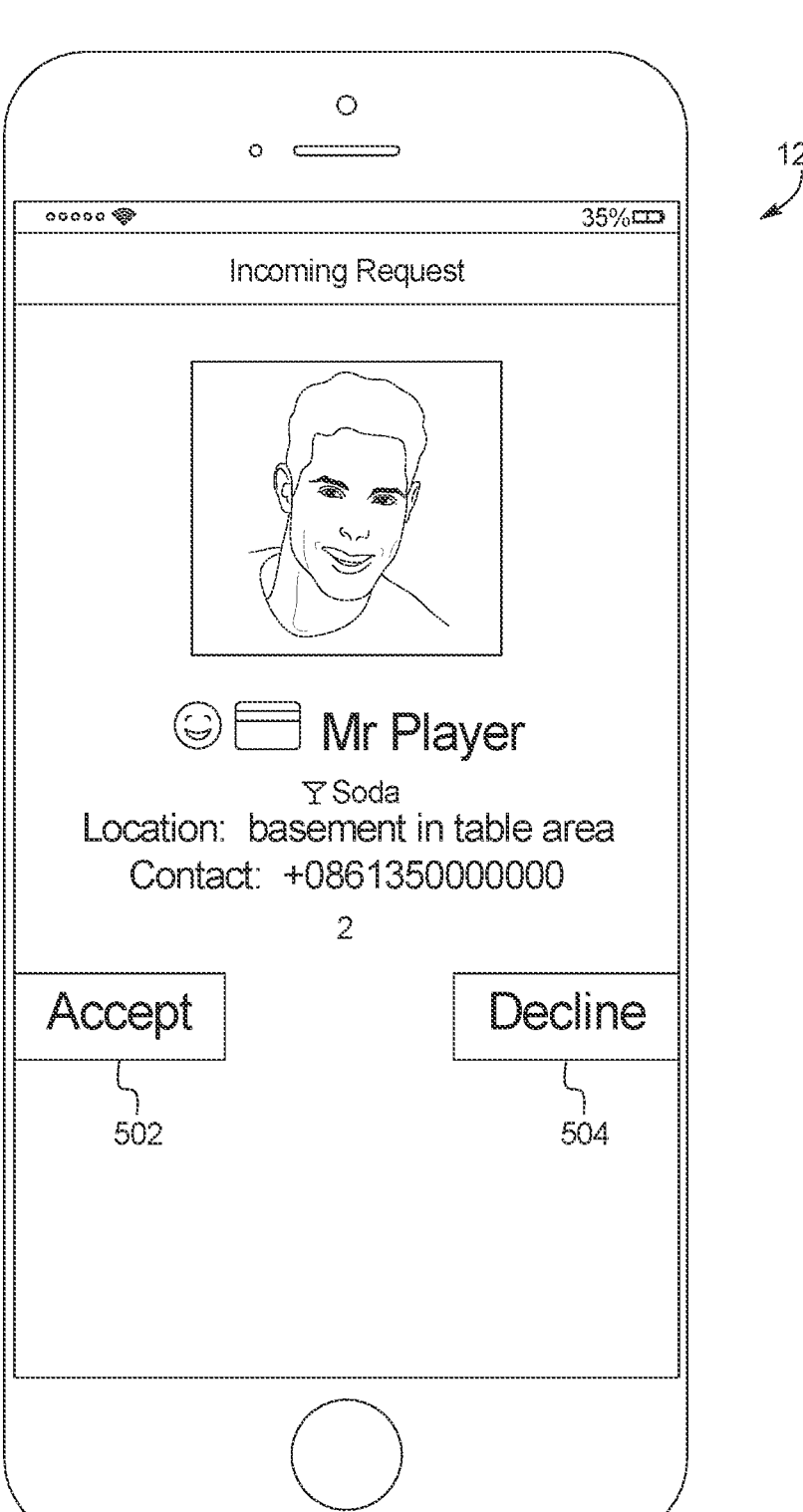

After initializing a campaign, the campaign management module electronically assigns each task in that campaign to a casino employee via the employee's mobile device, as described below with respect to FIG. 7. The campaign management module determines which employee to whom to assign a particular task based on any suitable information or data such as, but not limited to one or more of: (1) the location of the employees' mobile devices (e.g., the campaign management module is more likely to assign a task to an employee relatively close to the patron); (2) the quantity of tasks of other campaigns the employees have been assigned (e.g., the campaign management module is more likely to assign a task to an employee who is assigned a low quantity of tasks compared to other employees); (3) the types and quantity of identical or similar tasks the employees have previously completed (e.g., the campaign management module is more likely to assign a task to an employee who has completed a large quantity of similar tasks compared to other employees); (4) the employee's patron satisfaction ranking (e.g., the campaign management module is more likely to assign a task to an employee with a high patron satisfaction ranking compared to other employees); and/or (5) the employee's history with the patron (e.g., the campaign management module is more likely to assign a task to an employee who has previously interacted with the patron).

Additionally, after initializing a campaign, the campaign management module monitors the progress of the campaign by communicating with the mobile device(s) of the employee(s) assigned the tasks of the campaign. As described below with respect to FIG. 10C, when an employee completes an assigned task, the employee provides a completion input to the employee's mobile device. The employee's mobile device communicates the received completion input to the campaign management module to indicate that the task has been completed. The campaign management module then marks the task as complete. Once all tasks associated with an active campaign have been completed, the campaign management module marks the campaign as complete. The campaign management module may store any suitable information association with the completion of tasks and campaigns, such as (but not limited to): (1) which employee completed each task; (2) the time it took to complete each task; (3) the time it took to complete a campaign; (4) patron feedback; and/or (5) employee feedback.

While in this example embodiment the campaign management modules are web-based services, in other embodiments the system includes certain hardware, such as one or more servers, configured to carry out the functionality of one or both of the campaign management modules.

1.6 Request Management Module

The request management module 112 is a web-based service configured to manage, distribute, and track patron service requests.

The request management module 112 monitors for receipt of patron-generated service requests (such as those sent via patron mobile device, via an EGM, via speaking with a casino employee, etc.) and, responsive to a patron-generated service request, assigns an appropriate employee to carry out the service request and monitors the status of the service request (similar to the manner described in U.S. Patent Application Publication No. 2016/0093135 with respect to floor service events (e.g., broken EGMs), the entire contents of which are incorporated herein by reference).

Although not described in detail above for clarity, the request management module 112 also integrates with the patron engagement campaign management module 110 and the patron intervention campaign management module 116 to manage and assign engagement and intervention tasks to employees.

While in this example embodiment the request management module 112 is a web-based service, in other embodiments the system includes certain hardware, such as one or more servers, configured to carry out the functionality of the request management module 112.

1.7 Location Module

The location module 114 is a web-based service configured to electronically automatically determine and track the locations of the employee mobile devices 122 and the patron mobile devices 200 (and, by extension, the locations of the employees and patrons carrying those mobile devices). The location module 114 may do so in any suitable manner based on data received from the mobile devices, such as by using GPS coordinates (or other suitable location data) received from the mobile devices, via a Wi-Fi-based positioning system (WPS) that leverages the Wi-Fi interfaces of the mobile devices, via geo-fencing technology that leverages the Bluetooth transceivers of the mobile devices, via magnetic positioning based on magnetometer data received from the mobile devices, or via any suitable indoor or other positioning system. The location module 114 may also rely on data obtained from suitable hardware installed in the casinos, such as sensors or cameras. The location module 114 may also rely on a mobile device scanning a particular code (such as a barcode or a QR code) and sending the code to the location module 114 (e.g., via the message bus 106), near-field communication to employee and/or patron mobile devices from a receiver with a known location, an RFID associated with the employee (e.g., on the employee's keycard) triggering an RFID sensor, and/or a patron checking into the casino via the patron mobile device.

While in this example embodiment the location module 114 is a web-based service, in other embodiments the system includes certain hardware, such as one or more servers, configured to carry out the functionality of the location service 114.

1.8 Server

Figure 2:
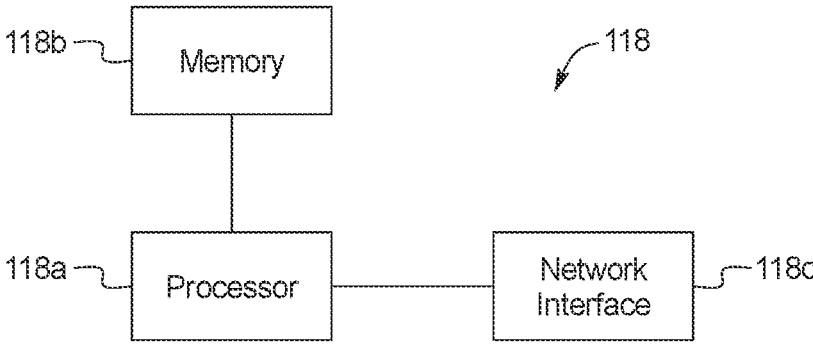
FIG. 2 is a block diagram of one example embodiment of the server of the casino patron engagement system of FIG. 1.

The server 118 is configured to facilitate communication and data transfer between the EGMs 120, the employee mobile devices 122, and the patron mobile devices 200 and the remainder of the casino patron engagement system 100. As shown in FIG. 2, the server 118 includes: (1) a server processor 118a; (2) a server memory 118b; and (3) a server network interface 118c.

The server processor 118a is configured to execute program code or instructions stored on the server memory 118b to control operation of the server 118. The server processor 118a may be a general-purpose processor; a content-addressable memory; a digital-signal processor; an application-specific integrated circuit; a field-programmable gate array; any suitable programmable logic device, discrete gate, or transistor logic; discrete hardware components; or any combination of these. The server processor 118a may be a microprocessor, a controller, a microcontroller, or a state machine. It may also be implemented as a combination of computing devices, such as a combination of a digital signal processor and a microprocessor, a plurality of microprocessors, or one or more microprocessors in conjunction with a digital signal processor core.

The server memory 118b is configured to store, maintain, and provide data as needed to support the functionality of the server 118. For instance, in various embodiments, the server memory 118b stores program code or instructions executable by the server processor 118a to control operation of the server 118. The server memory 118b may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The server network interface 118c is configured to connect the server 118 to a wireless network—such as the Internet, a local area network, or a cellular network—and to facilitate bidirectional communication between the server 118 and other devices connected to that wireless network.

1.9 Electronic Gaming Machines

Figure 3:
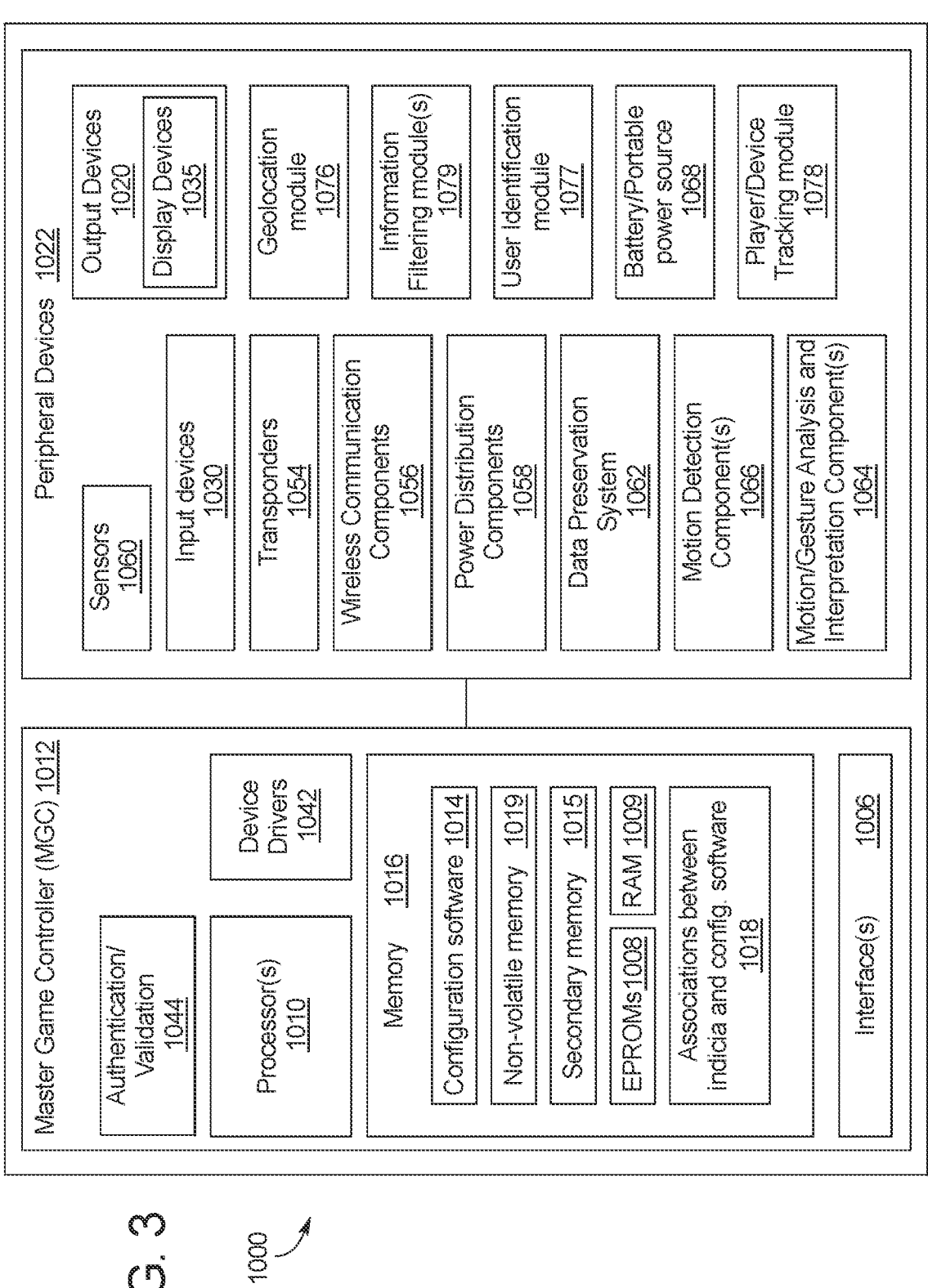
FIG. 3 is a block diagram of an example electronic configuration of the EGM of the casino patron engagement system of FIG. 1.

The plurality of electronic gaming machines (EGMs) 120a, 120b, . . . 120z are any of the EGMs described below. FIG. 3 is a block diagram of an example EGM 1000 and FIGS. 4A and 4B include two different example EGMs 2000a and 2000b. The EGMs 1000, 2000a, and 2000b are merely example EGMs, and different EGMs may be implemented using different combinations of the components shown in the EGMs 1000, 2000a, and 2000b.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 4A includes a central display device 2116, a player tracking display 2140, a credit display 2120, and a bet display 2122. The example EGM 2000b illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 4A and 4B each include a ticket printer and dispenser 2136. Examples of ticket-in ticket-out (TITO) technology are described in U.S. Pat. Nos. 5,429,361, entitled "Gaming Machine Information, Communication and Display System"; U.S. Pat. No. 5,470,079, entitled "Gaming Machine Accounting and Monitoring System"; U.S. Pat. No. 5,265, 874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/ Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/ 0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000a and 2000b illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000a and 2000b illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000a and 2000b illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000a and 2000b illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

Figure 4A:
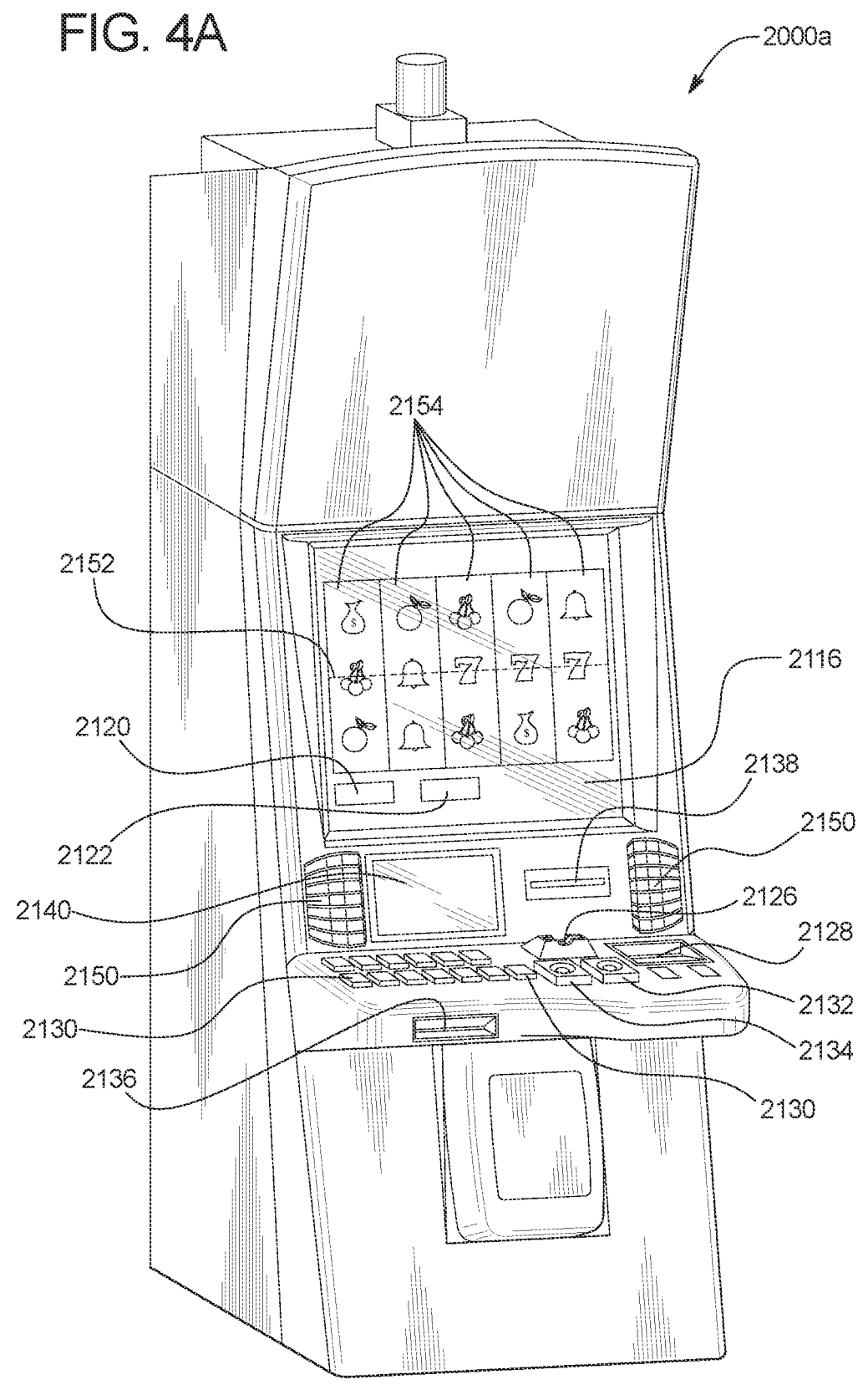
FIGS. 4A and 4B are perspective views of example alternative embodiments of the EGM of FIG. 3.
Figure 4B:
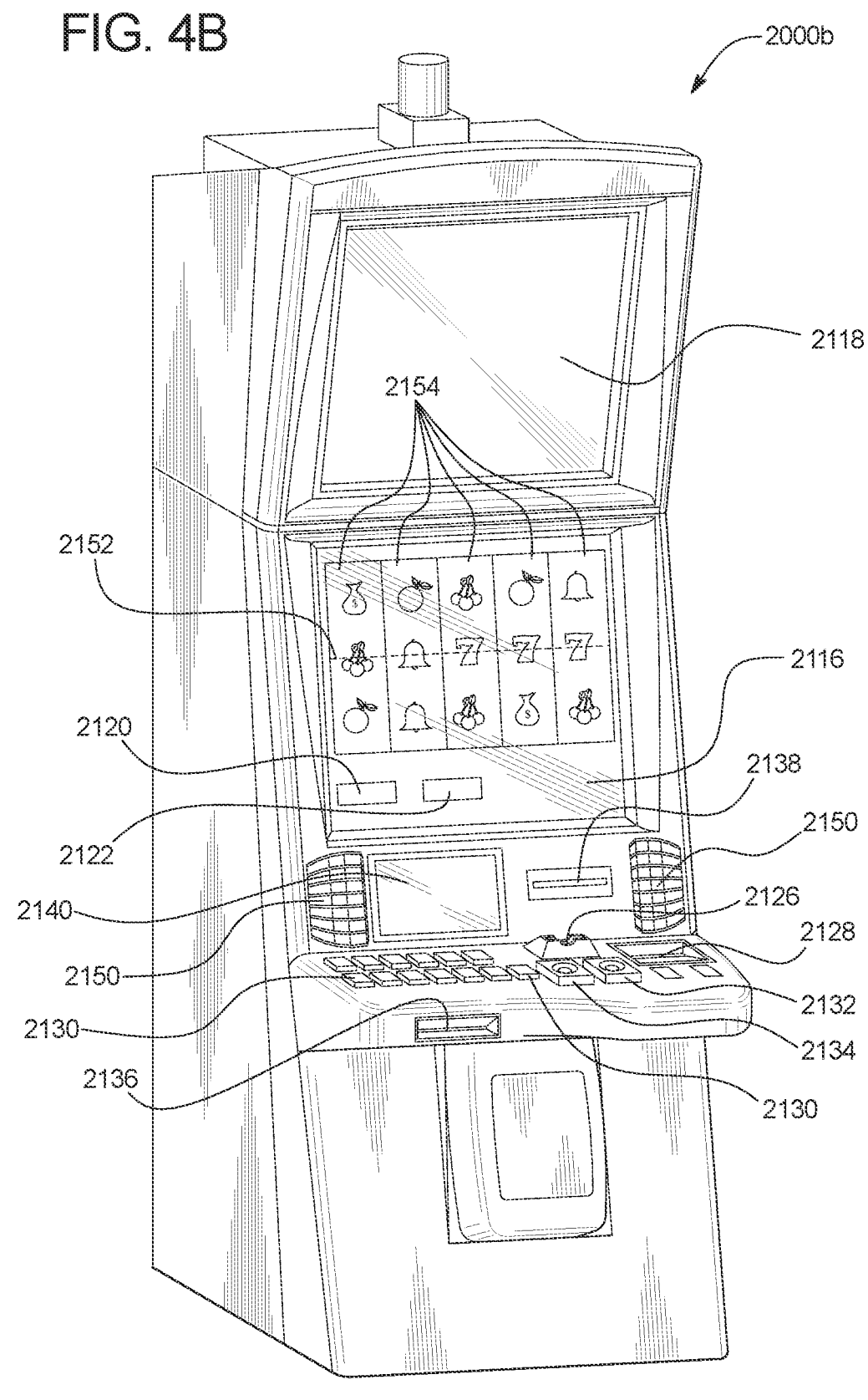

As generally described above, in certain embodiments, such as the example EGMs 2000a and 2000b illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all EGMs, and these example EGMs may not include one or more elements that are included in other EGMs. For example, certain EGMs include a coin/bill acceptor while others do not.

1.9.1. Operation of Primary Games and Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central controller and a changeable EGM, the at least one memory device of the central controller stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central controller is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central controller to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. Nos. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. Nos. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central controller and an EGM, the EGM is configured to communicate with the central controller for monitoring purposes only. In such embodiments, the EGM determines the game outcome(s) and/or award(s) to be provided in any of the manners described above, and the central controller monitors the activities and events occurring on the EGM. In one such embodiment, the gaming system includes a real-time or online accounting and gaming information system configured to communicate with the central controller. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. Nos. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. Nos. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. Nos. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. Nos. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

1.9.2 Differentiating EGMs from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201, 662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

1.10 Employee Mobile Devices

The plurality of employee mobile devices 122*a* . . . 122*z* may be any suitable mobile devices configured to wirelessly communicate with the server 118, such as (but not limited to) a mobile phone (such as a smart phone), a tablet computing device, a personal digital assistant, a wearable computing device (such as a smartwatch), or a laptop computer.

Figure 5:
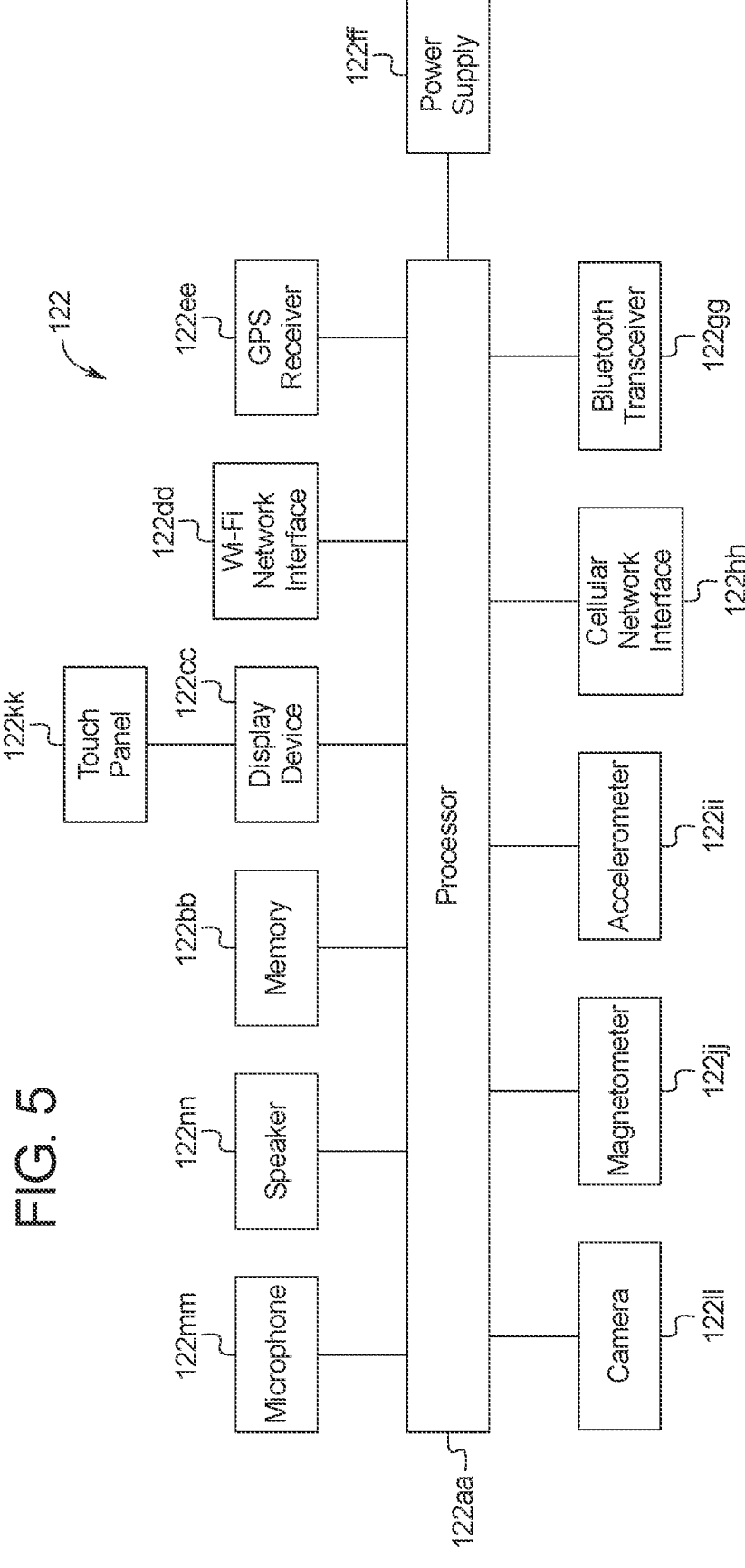
FIG. 5 is a block diagram of one example embodiment of the employee mobile device of the casino patron engagement system of FIG. 1.

FIG. 5 is a block diagram of one example embodiment of an employee mobile device 122 in the form of a smart phone that includes: (1) a mobile phone processor 122*aa*; (2) a mobile phone memory 122*bb*; (3) a display device 122*cc*; (4) a Wi-Fi network interface 122*dd*; (5) a GPS receiver 122*ee*; (6) a power supply 122*ff*; (7) a Bluetooth transceiver 122*gg*; (8) a cellular network interface 122*hh*; (9) an accelerometer 122*ii*; (10) a magnetometer 122*jj*; (11) a touch panel 122*ll*; (12) a camera 122*mm*; (13) a microphone 122*nn*; and (14) a sound producing device such as a speaker 270.

The mobile phone processor 122*aa* is configured to execute program code or instructions stored on the mobile phone memory 122*bb* to control operation of the employee mobile phone 122. The mobile phone processor 122*aa* may be a general-purpose processor; a content-addressable memory; a digital-signal processor; an application-specific integrated circuit; a field-programmable gate array; any suitable programmable logic device, discrete gate, or transistor logic; discrete hardware components; or any combination of these. The mobile phone processor 122*aa* may be a microprocessor, a controller, a microcontroller, or a state machine. It may also be implemented as a combination of computing devices, such as a combination of a digital signal processor and a microprocessor, a plurality of microprocessors, or one or more microprocessors in conjunction with a digital signal processor core.

The mobile phone memory 122*bb* is configured to store, maintain, and provide data as needed to support the functionality of the employee mobile phone 122. For instance, in various embodiments, the mobile phone memory 122*bb* stores program code or instructions executable by the mobile phone processor 122*aa* to control the employee mobile phone 122. The mobile phone memory 122*bb* may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The display device 122*cc* is configured to display images and video responsive to signals received from the mobile phone processor 122*aa*. In various embodiments, the display device includes, without limitation: a liquid-crystal display, a display based on light-emitting diodes (LEDs), a display based on a plurality of organic LEDs, a display based on polymer LEDs, a display based on a plurality of surface-conduction electron emitters, a display including a projected or reflected image, a plasma display, or any other suitable display mechanism.

The touch panel 122*ll* enables a user to provide different inputs to the employee mobile phone 122. The touch panel 122*ll* is overlaid atop the display device 122*cc* and enables a user to provide various inputs to the employee mobile phone 122 by performing any of a variety of different touch operations (e.g., touching and releasing the touch panel, swiping the touch panel, and double tapping the touch panel) with her finger or a compatible stylus, depending on the embodiment. The touch panel 122*ll* is configured to send the coordinate data of the detected location of the input touch operation to the mobile phone processor 122*aa*, which is configured to control the employee mobile phone 122 to perform an operation responsive to the received touch input. In this example embodiment, the touch panel 122*ll* is a capacitive touch panel, though the employee mobile phone 122 may include any suitable type of touch panel (such as a resistive touch panel).

The Wi-Fi network interface 122*dd* is configured to connect the employee mobile phone 122 to a wireless network-such as the Internet or a local area network- and to facilitate bidirectional communication between the employee mobile phone 122 and other devices connected to that wireless network.

The GPS receiver 122*ee* is configured to acquire geolocation data from one or more remote sources (such as one or more GPS satellites) and to send that geolocation data to the mobile phone processor 122*aa*. The mobile phone processor 122*aa* is configured to use the geolocation data to determine information relating to the absolute position of the employee mobile phone 122 on the Earth or a relative position of the employee mobile phone 122 on the Earth as compared to another absolute position on the Earth (such as the absolute position of a restaurant the user wants to visit).

The power supply 122*ff* includes a battery, such as a lithium-polymer battery, a lithium-ion battery, a nickel-metal-hydride battery, a nickel-cadmium battery, or any other suitable rechargeable or non-rechargeable power supply sufficient to power the components of the employee mobile phone 122.

The Bluetooth transceiver 122*gg* is configured to wirelessly pair the employee mobile phone 122 to another Bluetooth-enabled device and to facilitate bidirectional communication between the employee mobile phone 122 and the other Bluetooth-enabled device.

The cellular network interface 122*hh* is configured to connect the employee mobile phone 122 to a cellular network and to facilitate bidirectional communication between the employee mobile phone 122 and other devices connected to the cellular network.

The accelerometer 122*ii* is configured to detect acceleration data of the employee mobile phone 122 on two or three axes and to transmit the acceleration data to the mobile phone processor 122*aa*. The mobile phone processor 122*aa* is configured to use the acceleration data to determine the motion and orientation of the employee mobile phone 122.

The magnetometer 122*jj* is configured to measure the Earth's magnetic field, determine the direction of the Earth's magnetic North, and transmit data representing the direction of the Earth's magnetic North to the mobile phone processor 122*aa*. The mobile phone processor 122*aa* is configured to use the GPS coordinates of the mobile phone and a global map of declination angle (the angle between the Earth's true North and the Earth's magnetic North) to determine a required correction angle. The mobile phone processor 122*aa* is configured to apply the required correction angle to the direction of the Earth's magnetic North to obtain the direction of the Earth's true North. The magnetometer 122*jj* thus enables digital compass functionality on the employee mobile phone 122.

The camera 122*mm* is any suitable camera configured to capture still images or video clips, which are stored in the mobile phone memory 122*bb*.

The microphone 122*nn* and the speaker 270 are suitable devices respectively configured to receive and output sound, and may interface with suitable analog-to-digital and digital-to-analog converters.

2. Employee Mobile Device Application

An employee mobile device application that facilitates communication between employees and the hardware and modules of the casino patron engagement system 100 is installed on each employee mobile device 122. Different functions of the employee mobile device application are described below.

2.1 Interactive Casino Floor or Patron Engagement Map

The employee mobile device 122 is configured to (via the employee mobile device application) display an interactive casino floor or patron engagement map. The interactive casino floor map includes: (1) a layout of the casino floor (and indicates, for instance, EGMs, table games, restaurants and bars, meeting rooms, walkways, cashiers, ticket redemption kiosks, and/or any other suitable information); (2) patron location indicators overlaid atop the casino floor layout that indicate the locations of patrons' mobile devices; and (3) an employee location indicator overlaid atop the casino floor layout that indicates the location of the employee's mobile device 122. The interactive casino floor map enables the employee to use her mobile device to determine where patrons are located, view information (such as estimated emotional state data) about the patrons, view the status of active campaigns associated with the patrons, accept tasks associated with active campaigns, and input patron emotional state estimate data.

Figure 6A:
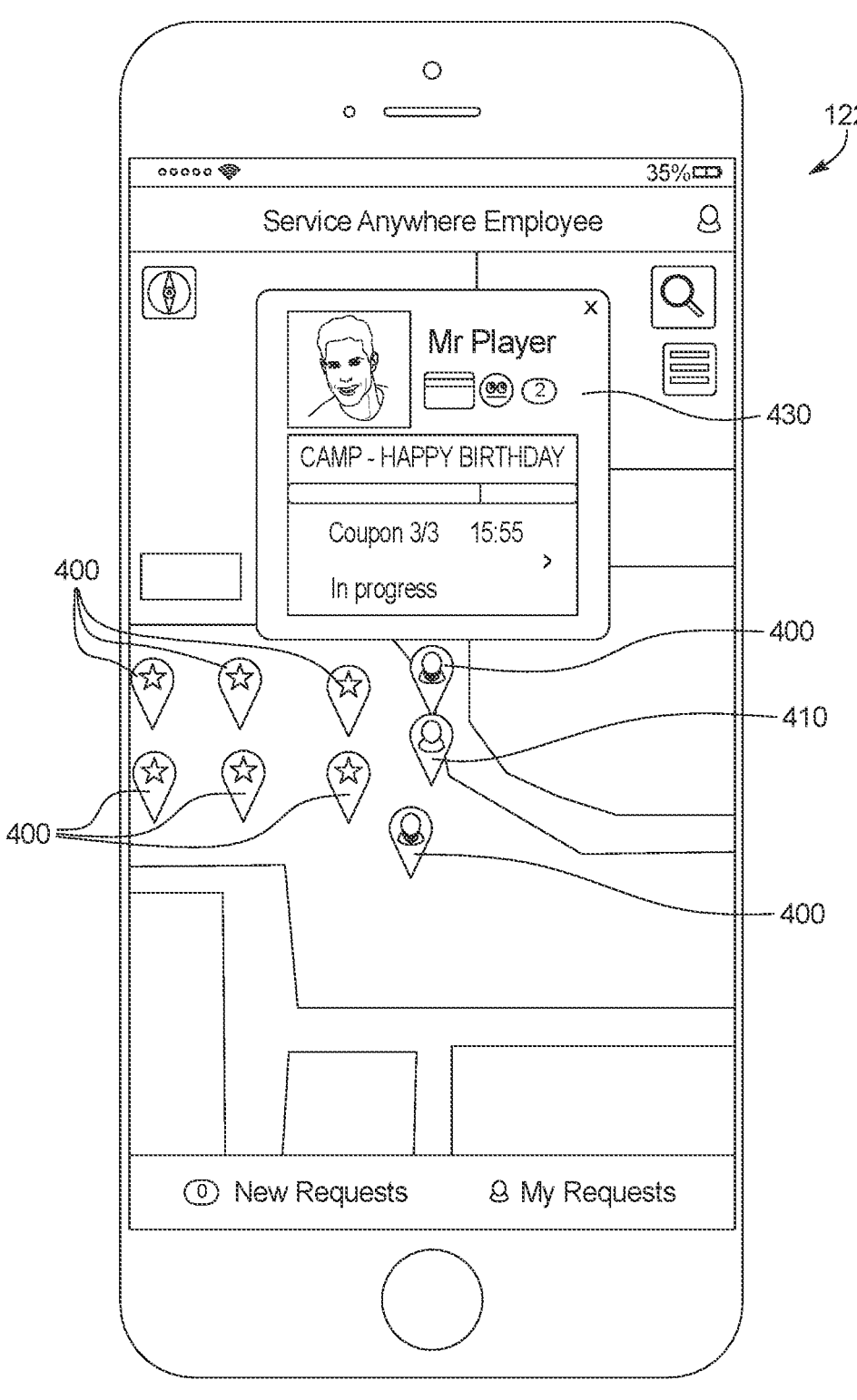
FIGS. 6A, 6B, 7, 8, 9, 10A, 10B, 10C, 11A, 11B, 12A, and 12B are example screenshots of a variety of different interfaces of the employee mobile device of FIG. 3 when operating an employee mobile device application.

As described above, in various embodiments of the present disclosure, the casino patron engagement system 100 uses location data received from the patron mobile devices 200 to determine the location of the patron mobile devices 200 on the casino floor. As shown in FIG. 6A, the employee mobile device 122 (via the employee mobile device application) displays patron location indicators 400 that indicate the location of the corresponding patron mobile devices 200 on the casino floor. Each patron location indicator 400 is selectable. As also shown in FIG. 6A, responsive to receiving a selection of one of the patron location indicators, the employee mobile device 122 (via the employee mobile device application) displays a pop-up window that includes information about the corresponding patron. This information may include some or all of the information included in the patron's profile generated by the patron profile module 108. In this example embodiment, pop-up window 430 includes: (1) an image of the patron; (2) the patron's name; (3) an icon identifying the patron's player tracking card level or type; (4) an icon identifying the patron's estimated emotional state (determined using the patron's estimated emotional state data); (5) the quantity of times an employee has engaged the patron; and (6) a list of the patron's active patron engagement and/or intervention campaigns, which may indicate the patron's importance..

Figure 6B:
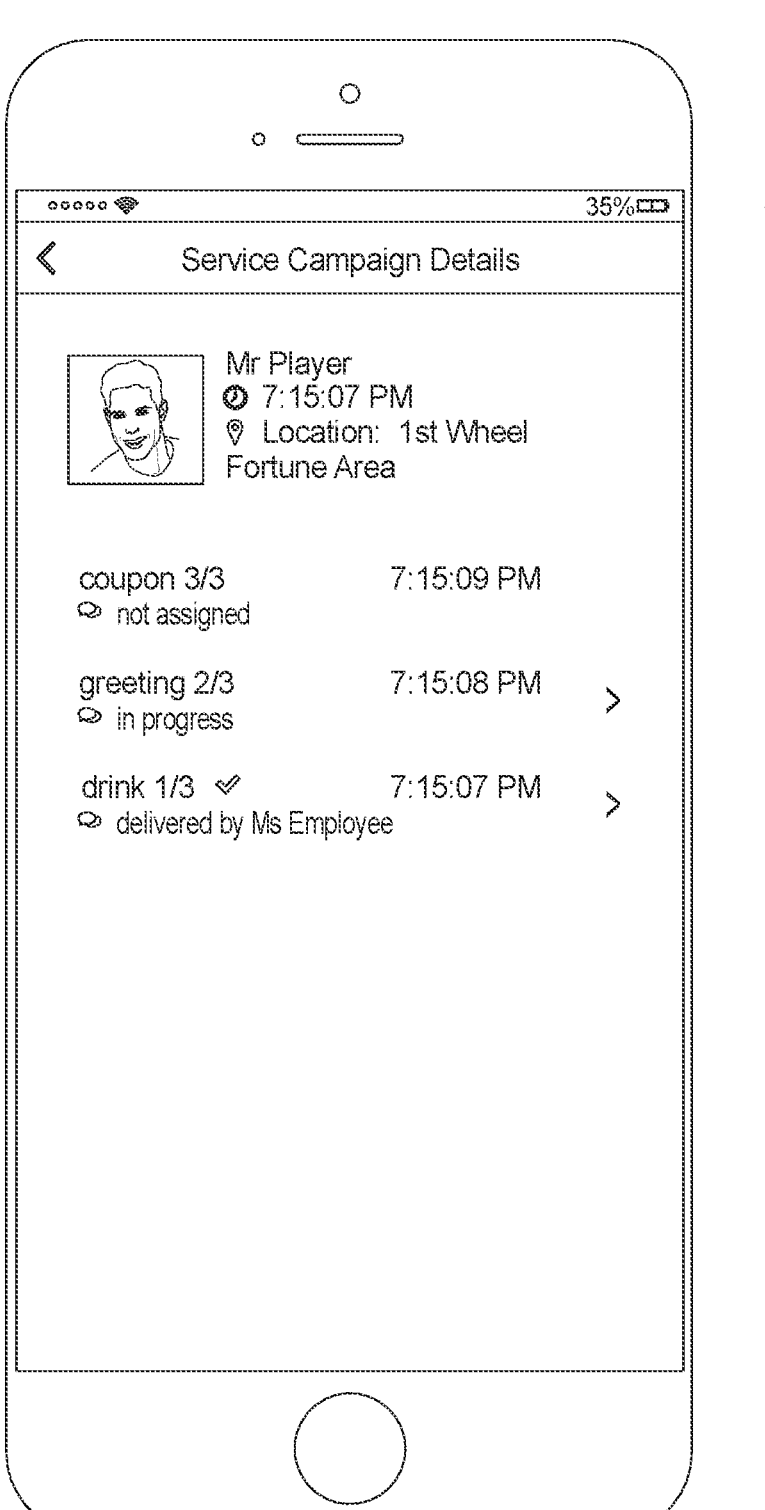

Each active campaign in the list 430f is selectable. Responsive to receiving a selection of one of the active campaigns in the list 430f, the employee mobile device 122 (via the employee mobile device application) displays additional information about that active campaign, such as the associated tasks and their status, as shown in FIG. 6B.

As described above, the casino patron engagement system 100 uses location data received from the employee mobile device 122 to determine the location of the employee mobile device 122 on the casino floor. As shown in FIG. 6A, the employee mobile device application causes the employee mobile device 122 to display an employee location indicator 410 that indicates the location of the employee mobile device on the casino floor.

The patron location indicators themselves may be colored, be shaped, and/or move in different ways that convey information. For instance, patron locators colored with one color (e.g., green) indicate that no unassigned tasks are associated with that patron while patron locators associated with another color (e.g., red) indicate that at least one unassigned task is associated with that patron. This enables the employee to quickly determine in real time which patrons need service or engagement. In another example, square patron locators indicate that the employee is assigned a task for those patrons, while triangle patron locators indicate that the employee is not assigned a task for those patrons. This enables the employee to quickly determine which patrons the employee is tasked with engaging.

In certain embodiments, the casino floor map displays different indicators in association with (or instead of) the patron location indicators to indicate campaign type, patron importance, task priority, and any other suitable information associated with the patron. For instance, in one example embodiment, the gaming system displays several concentric circles including: an innermost circle that indicates the type of active campaign for the patron (with the highest priority campaign shown if there are multiple active campaigns); an outermost circle that indicates the highest priority task in the active campaign; and a middle circle indicating the patron's importance. This enables an employee to quickly scan the casino floor map to search for high-priority tasks and high-priority patrons to engage.

In certain embodiments, the casino patron engagement system enables certain users-such as administrators or those provided access—to modify the casino floor map, which the casino patron engagement system pushes to the employee mobile devices. This enables users to revise the casino floor map on-the-fly to reflect changes to the casino floor, and ensures employees always have an up-to-date version of the casino floor map that reflects the actual casino floor at any given point in time.

In these embodiments, the casino patron engagement system stores or otherwise has read/write access to the casino floor map. The casino patron engagement system enables certain users to modify the casino floor map using the employee mobile device application. For instance, an employee may use the employee mobile device application to: (1) add an EGM indicator to the casino floor map; (2) move an EGM indicator on the casino floor map to another location on the casino floor map; (3) add a table indicator to the casino floor map; (4) move a table indicator on the casino floor map to another location on the casino floor map; (5) add or revise details associated with indicators on the casino floor map (e.g., change an EGM's name, location, available games, denomination, or model); (6) link an EGM or table indicator on the casino floor map to an actual EGM or table by entering a code, scanning a barcode or QR code, or in any other suitable manner; (7) add rooms; (8) add areas; (9) add watch zones; and/or (10) add entrance and exit doors.

2.2 Assignment of Tasks to Employees

As explained above, when a campaign initialization event occurs for a patron, the campaign management module initializes a campaign-which includes one or more tasks to be performed by an employee—for that patron. The campaign management module assigns an employee or employees the one or more tasks (as described above). The employee mobile device application enables dynamic communication of these tasks to the assigned employee(s). Specifically, when the campaign management module assigns an employee a task, the campaign management module sends a task request to the mobile device 122 of the employee. As shown in FIG. 7, the mobile device 122 of the employee displays the task associated with the task request and enables the employee to accept (via virtual button 502) or decline (via virtual button 504) the task. The mobile device 122 may display any suitable information associated with the task, such as information about the associated patron and a description of the task.

Figure 8:
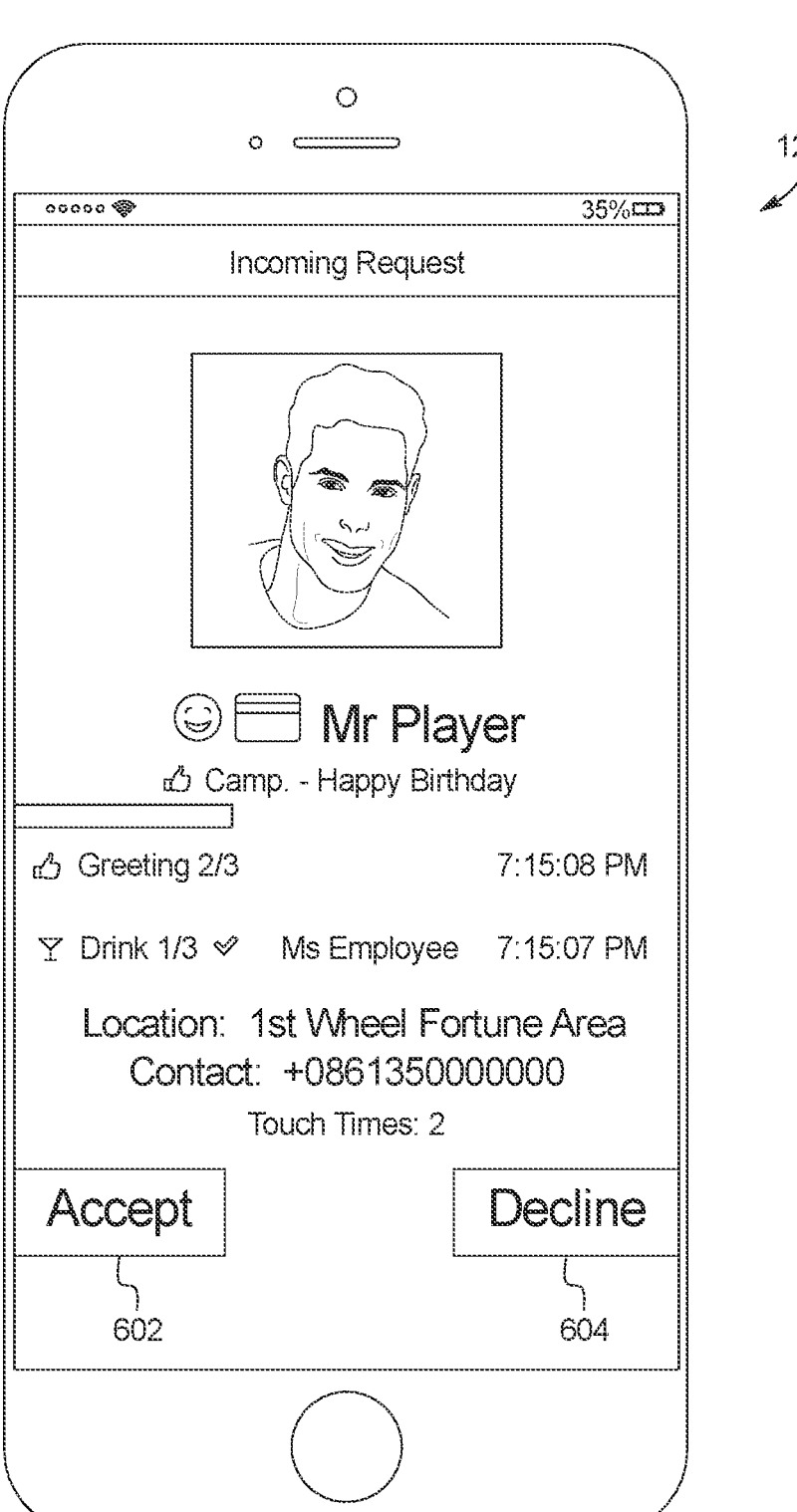

In instances in which a task isn't yet assigned, the employee mobile device application enables an employee to actively seek out and assign herself that particular task. For instance, the employee may notice that a particular patron indicator is colored in a way that indicates a task associated with that patron has not yet been assigned. The employee may select that patron indicator and then select the campaign in the list that has an unassigned task. This causes the mobile device to display the screen shown in FIG. 8, which enables the employee to accept (via virtual button 602) or decline (via virtual button 604) that particular task.

Figure 9:
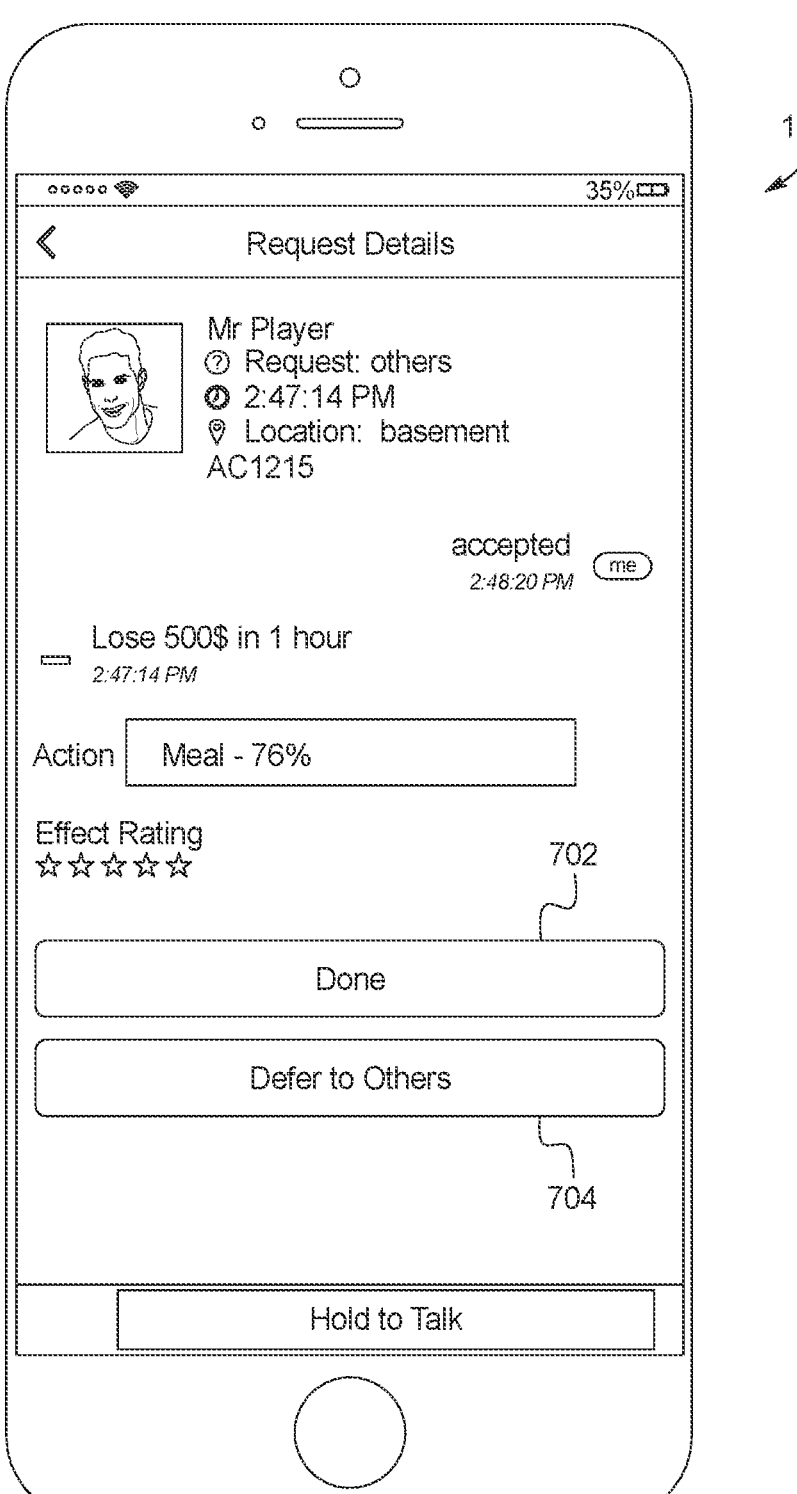

The employee mobile device application enables the user to indicate when an assigned task is complete or decline to perform the assigned task. FIG. 9 shows the mobile device 122 displaying a task complete virtual button 602 and a cancel button 604. The employee presses the task complete virtual button 602 after completing the task, which causes the employee mobile device 122 to send a task completion indication to the appropriate campaign management module. The employee presses the cancel button 604 if the employee cannot or no longer desires to complete the task, which causes the employee mobile device 122 to send a task cancellation request to the appropriate campaign management module (which then reassigns the task to another employee).

In certain embodiments, the employee mobile device application uses location data to alert the employee when the employee is near a patron having an active campaign with at least one unassigned task. For instance, when the mobile device comes within 10 feet (or any other suitable distance) of a patron having an active campaign with at least one unassigned task, the employee mobile device application causes the mobile device to output a suitable indication— such as display a pop-up window, vibrate, output a sound, and the like—to alert the employee of the nearby available task.

2.3 Patron Emotional State Estimate Data

The employee mobile device application enables an employee to input emotional state estimate data for patrons that reflect the employee's estimation of the patrons' emotional states (or moods). As described above, the patron profile module 108 takes patrons' emotional state estimate data into account when determining the patrons' estimated emotional state data.

Figure 10A:
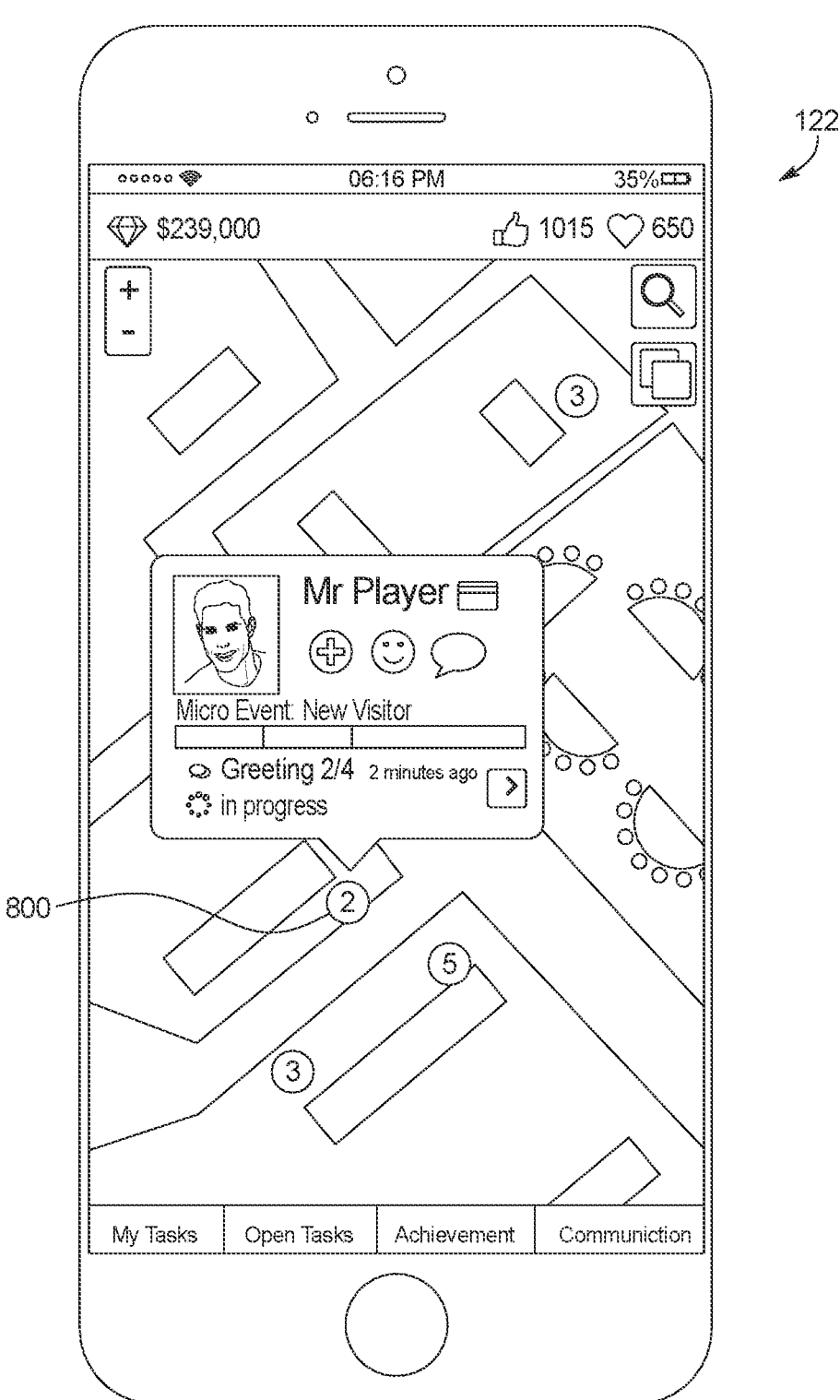
Figure 10B:
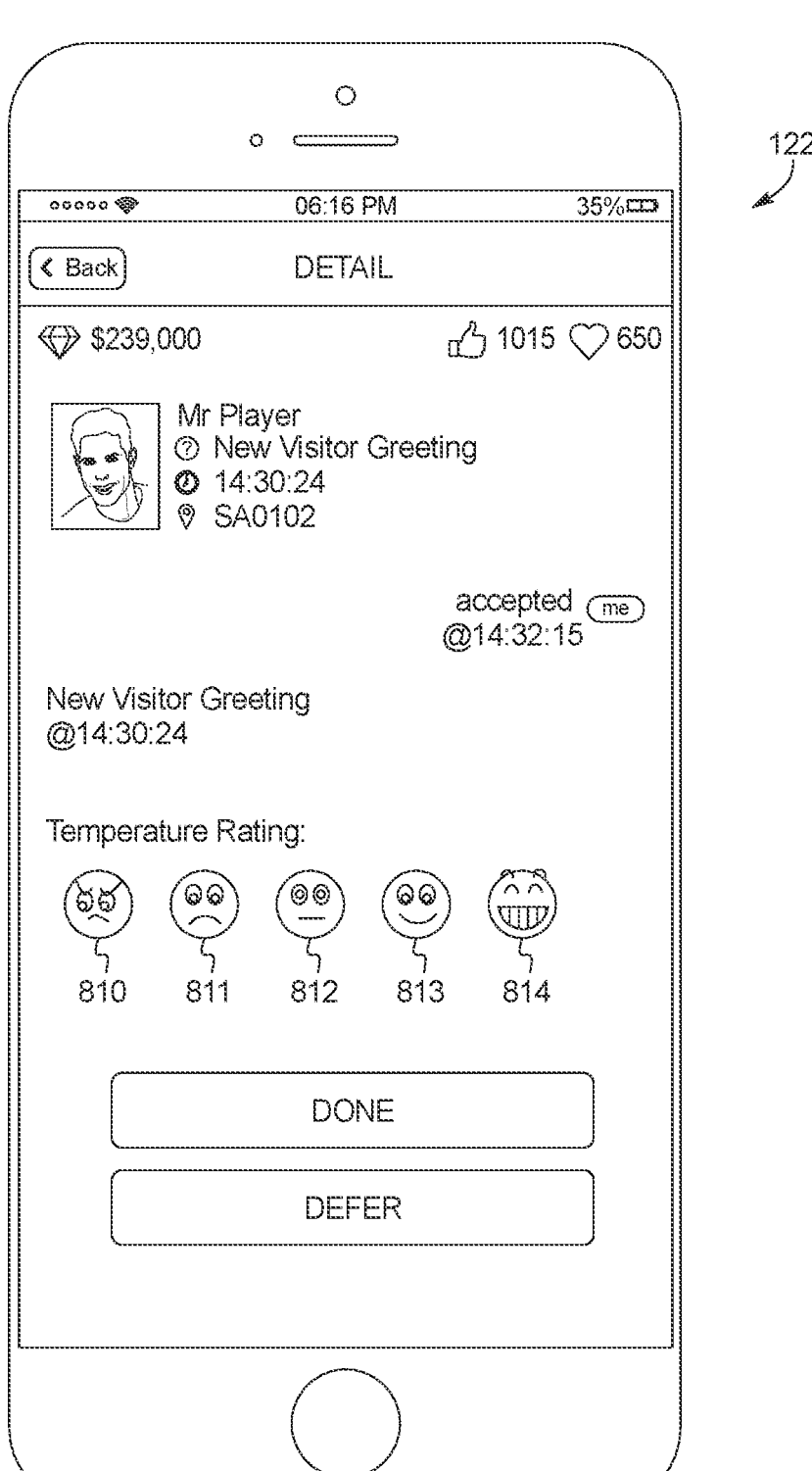
Figure 10C:
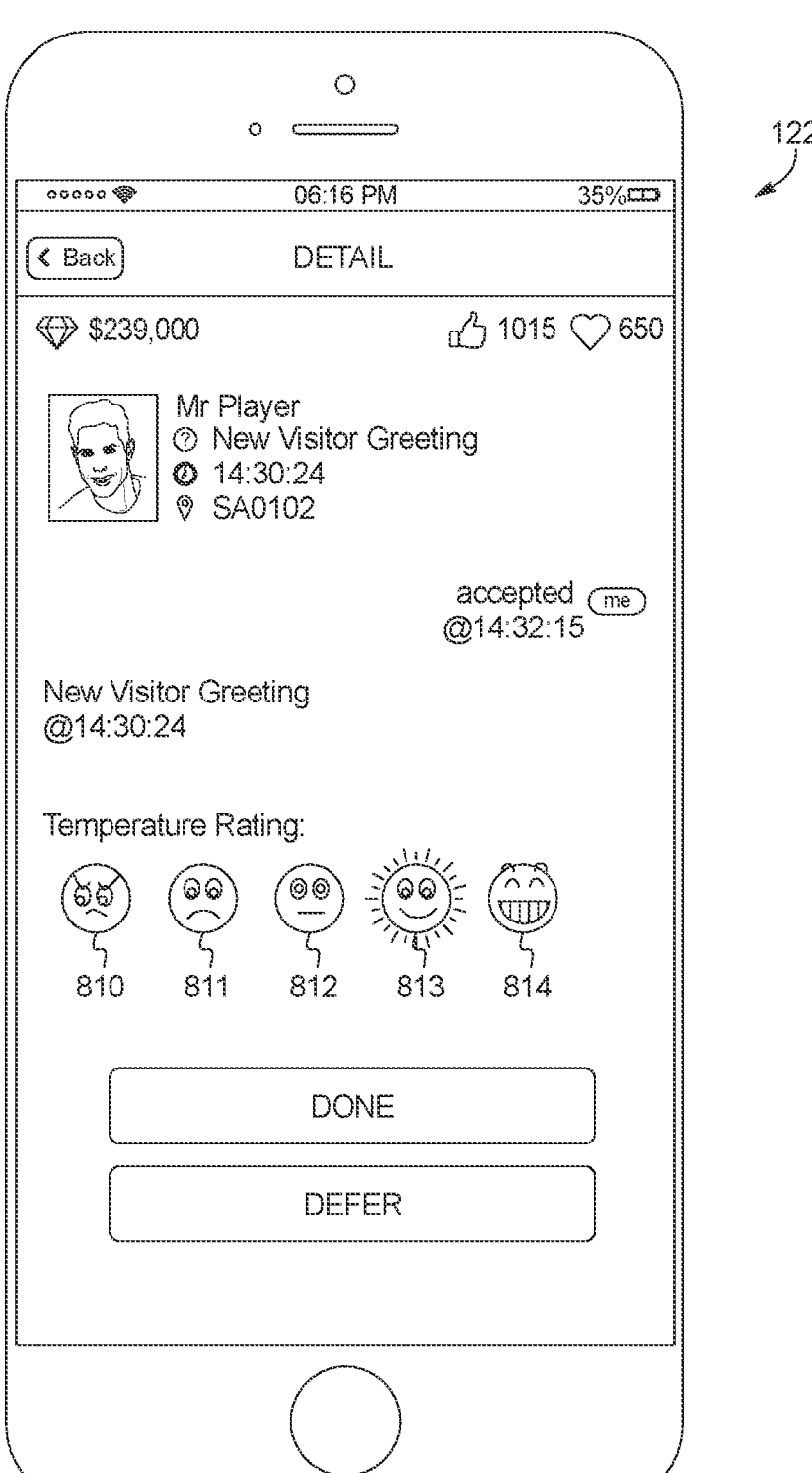

FIGS. 10A, 10B, and 10C illustrate screenshots of the employee mobile device 122 during the emotional state estimate data input process. To input emotional state estimate data for a patron, the employee first selects the corresponding patron indicator displayed on the casino floor map (here, patron indicator 800), as shown in FIG. 10A. In this example embodiment, as shown in FIG. 10B, the employee mobile device application invites the employee to select one of five different icons associated with patron estimated emotional state: 810 (very unhappy), 811 (unhappy), 812 (indifferent), 813 (happy), and 814 (very happy). As shown in FIG. 10C, here, the employee mobile device 200 receives a selection of the icon 802_d_. The employee mobile device 122 sends this emotional state estimate data for the patron to the server 118, which routes the emotional state estimate data to other hardware and modules of the casino patron engagement system 100 as described above. This is merely one example manner of enabling input of emotional state estimate data, and any suitable manner may be employed (e.g., using a slider bar or entering a numerical value).

In certain embodiments, the employee mobile device application uses location data to alert the employee when the employee is near a patron for which the employee can input emotional state estimate data. For instance, when the mobile device comes within 10 feet (or any other suitable distance) of a patron for which the employee has not input emotional state estimate data within the last 30 minutes (or any suitable time period), the employee mobile device application causes the mobile device to output a suitable indication (such as those described above) to alert the employee to input emotional state estimate data for the patron.

2.4 Employee Achievement Measures

Figure 11A:
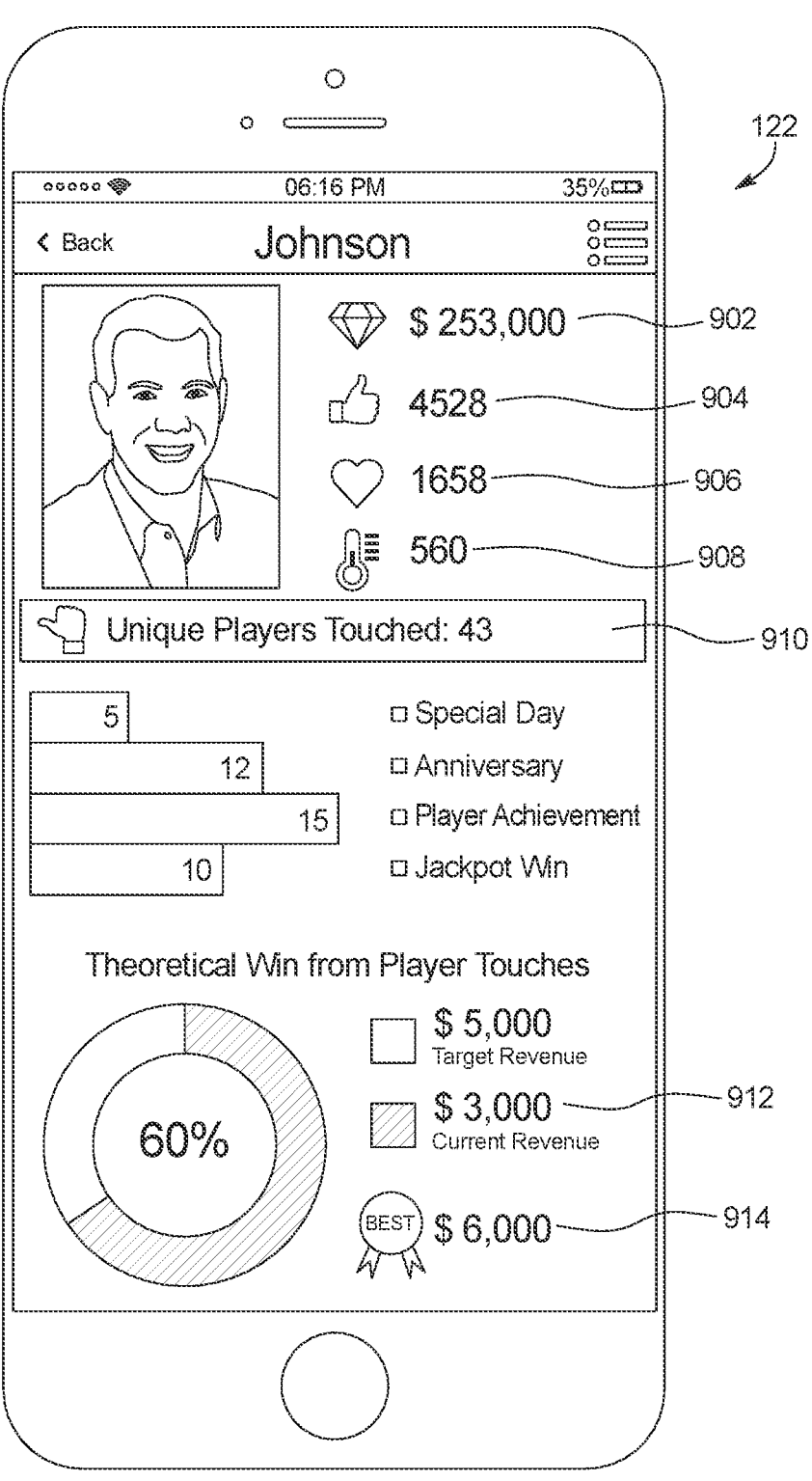
Figure 11B:
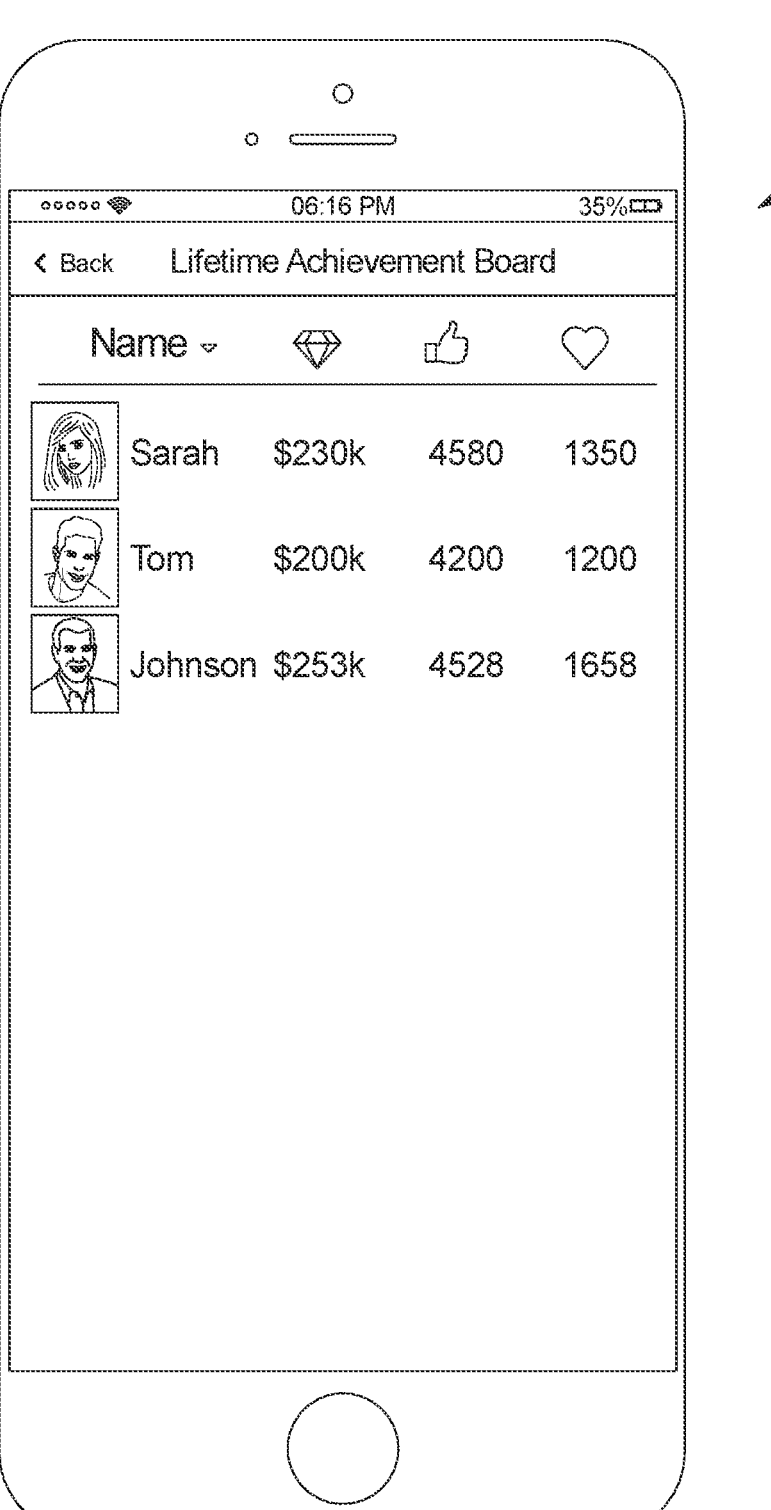

The employee mobile device application enables an employee to access and view various employee achievement measures. FIGS. 11A and 11B show screenshots of the mobile device 122 indicating various employee achievement measures, as indicated below. The employee achievement measures may include (but are not limited to): (1) the total quantity of revenue the casino has made attributable to patrons for which the employee has completed a task or service (labeled element 902 in FIG. 11A); (2) the quantity of unique patrons for which the employee has completed a task or service (labeled element 910 in FIG. 11A); (3) the total quantity of tasks or services the employee has completed (labeled element 906 in FIG. 11A); (4) the employee's patron-provided positive feedback score (labeled element 904 in FIG. 11A); (5) the particular tasks or services the employee has completed; (6) the theoretical (or actual spend) of the patrons for which the employee has completed a task or service in a particular time period (labeled element 912 in FIG. 11A); (7) the quantity of patrons for which the employee has input emotional state estimate data (labeled element 908 in FIG. 11A); (8) the employee's task and service completion goals for a particular time period; (9) the employee's personal bests of the above for a particular time period (labeled element 914 in FIG. 11A); (10) a leader board ranking employees by any of the above metrics (FIG. 11B); (11) a value-served score that represents the relationship to the business value of the employee's service delivery; and/or (12) a value-served class (e.g., Platinum, Diamond, Gold, Silver) of the employee determined per the employee's value-served score.

2.5 Employee Monitoring and Management

Figure 12A:
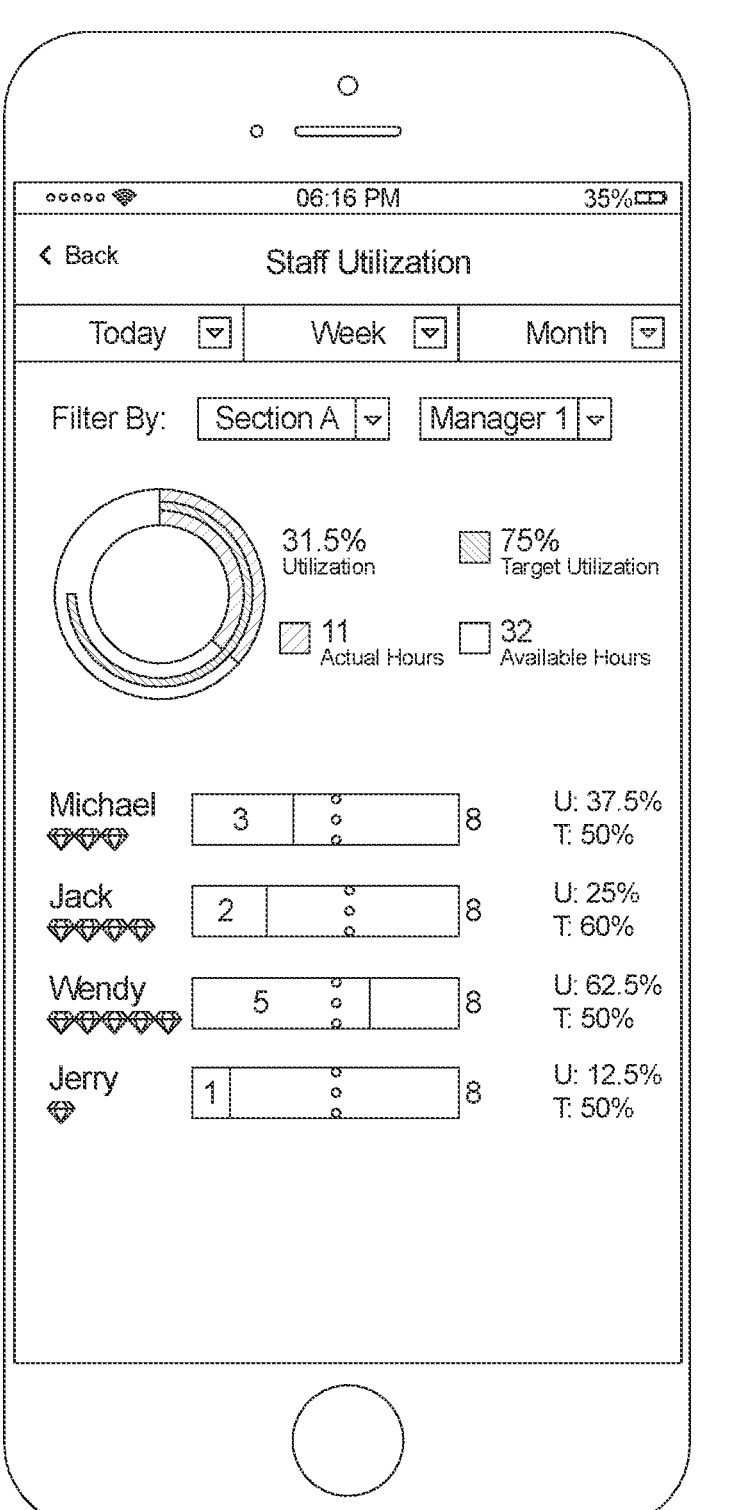
Figure 12B:
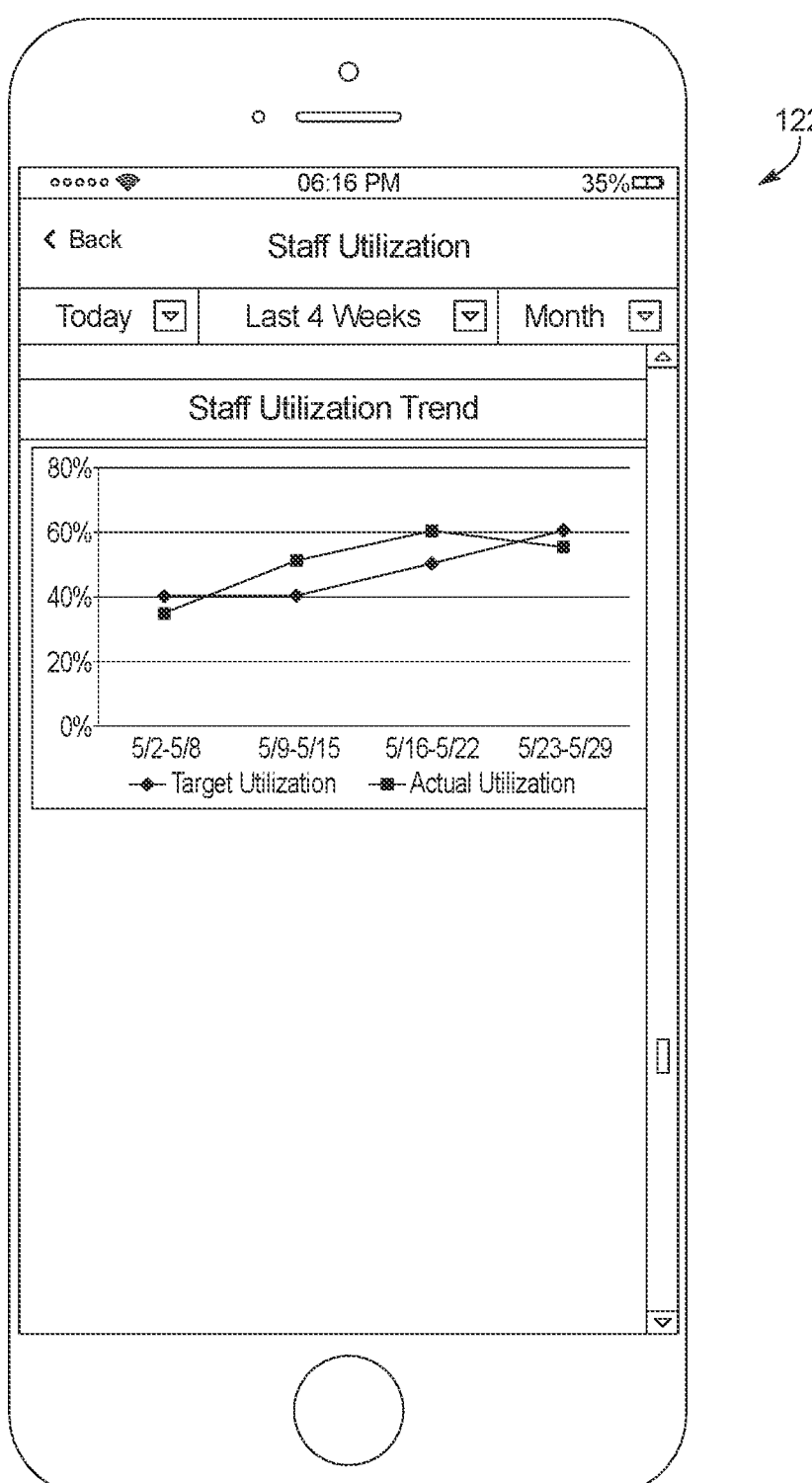

In various embodiments, the employee mobile device application enables certain users—such as administrators or supervisors—to view various employee utilization reports that provide information about employees' performance with respect to the casino patron engagement system. Employee utilization is the percentage of the employee's working hours spent on meaningful service tasks (e.g., an employee who spends 5 or 8 hours of her shift participating in campaigns and engaging customers is 60% utilized). FIG. 12A shows a screenshot of an example utilization report for four employees, while FIG. 12B shows a screenshot of employee utilization over time. In other embodiments, this functionality is available via a website or natively-stored software rather than an application stored on a mobile device.

3. Patron Feedback

In various embodiments, the casino patron engagement system 100 solicits patron feedback via one or more surveys that ask the patron to rate their experience at the casino or their experiences with casino employees. In one embodiment, the patron's EGM displays a survey responsive to termination of a gaming session (e.g., responsive to the patron's credit balance reaching 0 credits or responsive to an actuation of the cashout button on the patron's EGM).

In an example embodiment, the patron's EGM displays a survey (e.g., in a service window or pop-up window) responsive to the casino patron engagement system 100 receiving an indication from an employee mobile device that an employee completed a task for the patron.

In further example embodiments, the patron's EGM enables the player to complete a survey on-demand (e.g., via a service window).

In other example embodiments, the survey functionality is provided on an application installed on the patron's mobile device rather than (or in addition to) on the patron's EGM. The EGM (or mobile device) sends the results of the survey to the data analysis engine 104.

4. Example Implementation Embodiments

In various embodiments, the casino patron engagement system of the present disclosure does not include all of, and only includes certain of, the components of the example casino patron engagement system 100 described above. Specifically, in various embodiments, the casino patron engagement system only includes certain of the: (1) casino management system 102; (2) data analysis module 104; (3) message broker 106; (4) patron profile module 108; (5) patron engagement campaign management module 110; (6) request management module 112; (7) location module 114; (8) patron intervention campaign management module 116; and the (9) server 118, as described above.

For example, in certain embodiments, the casino patron engagement system of the present disclosure includes a server configured to communicate with a plurality of employee mobile devices.

In certain such embodiments, (a) the server is configured to securely communicate with a casino employee mobile device; (b) a casino patron mobile device of a casino patron is loaded with a casino mobile patron profile application and configured to output a patron mobile profile beacon; and (c) the casino employee mobile device is loaded with an employee application and configured to search for the casino patron mobile profile beacon that is outputted by the casino patron mobile device and to obtain casino patron profile ID data from the located the casino patron mobile device and/or outputted patron mobile profile beacon. The server is further configured to receive from the casino employee mobile device the profile ID data that is obtained by the casino employee mobile device from or after detecting the patron mobile profile beacon outputted by the casino patron mobile device. The server is further configured to, responsive to receipt of the profile ID data from the employee mobile device, send to the employee mobile device patron profile data associated with profile ID data, wherein the patron profile data enables the employee application to cause a display device of the employee mobile device to display patron profile information in association with proximity information received from mobile profile beacon to enable the employee to have appropriate information for interaction with the casino patron.

In certain embodiments, the server is configured to securely communicate with a casino employee mobile device, wherein the casino employee mobile device is loaded with the employee application and configured to search for multiple casino patron mobile profile beacons that are outputted by a plurality of casino patron mobile devices of a plurality of casino patrons. The employee mobile device loaded with the employee application is also configured to obtain casino patron profile ID data from each of the located the casino patron mobile devices and/or outputted patron mobile profile beacons. The server is further configured to receive from the casino employee mobile device profile ID data that is obtained by the casino employee mobile device after detecting the patron mobile profile beacons outputted by the casino patron mobile devices. The server is further configured to send to the employee mobile device patron profile data associated with profile ID data, wherein the patron profile data enables the employee application to cause a display device of the employee mobile device to display patron profile information for the plurality of casino patrons in association with related proximity information received from mobile profile beacons to enable the employee to have appropriate information for interaction with multiple casino patrons. The data enables the mobile device to display the casino patrons in an ordered list. The data thus better enables interaction with the casino patrons. The data may also enable the employee device to display one or more visual cues applied to patron identifications that are configured to assist the casino employee in recognizing and understanding the relative value of interacting with the casino patrons in the ordered list.

One such example implementation embodiment of the present disclosure is now described in more detail. In this example embodiment, the casino patron's mobile device is loaded with a casino-branded "Mobile Patron Profile" application that enables an LE Blue Tooth beacon (which is native functionality to various cell phones) and referred to herein as a Mobile Profile Beacon. In this example embodiment, the casino employee mobile device is loaded with an Employee application that is configured to search for casino patron Mobile Profile Beacons. In response to the employee making an input to the to the casino employee mobile device that causes the Employee application to search for patron Mobile Profile Beacons, and thereafter upon detecting one or more casino patron Mobile Profile Beacons, the Employee application receives a Profile ID from the beacon source for each Mobile Profile Beacon detected. Using the received Profile ID for each Mobile Profile Beacon detected, the Employee application requests a Patron Profile for the patron associated with that Profile ID from a server. Responsive to such request, for each Mobile Profile Beacon detected, the server sends the Patron Profile data associated with that Profile ID to the Employee application. The Employee application renders or causes the display device of the employee mobile device to display a list of all Patron Profiles received, ordered by proximity information received from Mobile Profile Beacons. Each displayed Patron Profile includes relevant information such as but not limited to the Patron Name, Patron Picture, and Patron Tier/VIP status. The display can include one or more visual cues applied to each row such as color and icons like "diamond rating" based on patron profile properties that help the employee recognize and understand the relative value of interacting with the identified casino patrons identified in each row of the ordered list.

In one further example of an enhanced or VIP implementation, the Mobile Patron Profile application can be configured to auto launch in response to detecting a signal from a casino employee mobile device loaded with the Employee application (and thus configured to search for casino patron Mobile Profile Beacons). After launching, the Mobile Patron Profile application will broadcast a VIP ID advertisement beacon. In this example enhanced VIP implementation, the casino employee mobile device loaded with the Employee application will scan for unique VIP Patron Profile Beacons. In response to detecting a VIP Mobile Profile Beacon, the Employee application will obtain or fetch the VIP's Patron Profile from the server and then cause the display device of the mobile device to display each of the VIP's Patron Profiles in order of proximity to the casino employee mobile device. More specifically, the employee mobile device loaded with the Employee application will securely communicate (such as via a wifi connection) to the server to obtain the VIP patron profile information.

The display will include one or more visual cues applied to each row such as color and icons like "diamond rating" based on VIP patron profile properties that help the casino employee recognize and understand the relative value of interacting with the identified VIP casino patrons identified in each row of the ordered list.

In various embodiments as mentioned above, the casino patron engagement system of the present disclosure is further configured to track data regarding each casino employee's use of the system and specifically use of the system for interactions or facilitating interactions with casino patrons. Such tracked data can be used for multiple different analysis and various different purposes (including but not limited to fees relating to the use of the system).

In various embodiments as mentioned above, the casino patron engagement system of the present disclosure enables each casino employee to specify the type of service rendered for each casino patron during the casino patron engagement in the casino.

In various embodiments as mentioned above, the casino patron engagement system of the present disclosure enables the casino employee to add to each patron profile such as with specific patron related notes and/or information.

In various embodiments, the casino patron engagement system of the present disclosure is configured to provide casino or venue based information or ratings in or related to the patron profile, where such information or rating indicates a value of casino patron spend in one or more visits by the casino patron to the casino.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A casino patron engagement system comprising:
a server configured to securely communicate with a casino employee mobile device,
wherein the casino employee mobile device is loaded with an employee application and configured to search for a casino patron mobile profile beacon that is outputted by a casino patron mobile device of a casino patron, and
wherein the casino patron mobile device is loaded with a casino mobile patron profile application and configured to automatically output the casino patron mobile profile beacon including broadcast packets receivable and identifiable by the casino employee mobile device;
the server further configured to receive from the casino employee mobile device profile ID data that is obtained by the casino employee mobile device as a result of detecting the casino patron mobile profile beacon outputted by the casino patron mobile device;
the server further configured to, responsive to receipt of the profile ID data from the casino employee mobile device, send to the casino employee mobile device patron profile data associated with the profile ID data, wherein the patron profile data enables the employee application to cause a display device of the casino employee mobile device to display:
a name of the casino patron,
a floor map,
an employee location indicator displayed on the floor map and representing a current location of the casino employee mobile device, and
a patron location indicator displayed on the floor map and representing a current location of the casino patron mobile device; and
the server further configured to assign a task of a patron engagement campaign for the casino patron to a selected casino employee based at least in part on a current location of a casino employee mobile device associated with the selected casino employee and a quantity of tasks assigned to the selected casino employee.

2. The casino patron engagement system of claim 1, wherein information for completing the patron engagement campaign associated with the casino patron includes patron status.

3. The casino patron engagement system of claim 1, wherein the server is further configured to track data regarding a casino employee interaction with the casino patron.

4. The casino patron engagement system of claim 1, wherein the server is further configured to receive data regarding the task rendered for the casino patron.

5. The casino patron engagement system of claim 1, wherein the server is further configured to receive data generated from a casino employee input of data for adding to the patron profile data.

6. The casino patron engagement system of claim 1, wherein the server is further configured to receive patron feedback from an electronic gaming machine.

7. The casino patron engagement system of claim 1, wherein the server is further configured to receive patron feedback from the casino patron mobile device.

8. A casino patron engagement system comprising:
a server configured to securely communicate with a casino employee mobile device,
wherein the casino employee mobile device is loaded with an employee application and configured to search for casino patron mobile profile beacons that are outputted by a plurality of casino patron mobile devices of a plurality of casino patrons, and
wherein the casino patron mobile devices are each loaded with a casino mobile patron profile application and configured to automatically output a casino patron mobile profile beacon associated with that casino patron mobile device including broadcast packets receivable and identifiable by the casino employee mobile device;
the server further configured to receive from the casino employee mobile device profile ID data that is obtained by the casino employee mobile device as a result of detecting the casino patron mobile profile beacons outputted by the casino patron mobile devices;
the server further configured to, responsive to receipt of the profile ID data from the casino employee mobile device, send to the casino employee mobile device patron profile data associated with the profile ID data, wherein the patron profile data enables the employee application to cause a display device of the casino employee mobile device to display for each casino patron mobile device:
an image of the casino patron for the casino patron mobile device,
a name of the casino patron for the casino patron mobile device,
a patron location indicator representing a current location of the casino patron mobile device, and
a priority level corresponding to the casino patron for the casino patron mobile device; and
the server further configured to, for each casino patron mobile device, assign a patron engagement task associated with the casino patron for said casino patron mobile device, to a selected casino employee based at least in part on a current location of a casino employee mobile device associated with the selected casino employee and a quantity of tasks assigned to the selected casino employee relative to other casino employees.

9. The casino patron engagement system of claim 8, wherein each patron engagement task is based on a patron status.

10. The casino patron engagement system of claim 8, wherein the server is further configured to track data regarding each casino employee interaction with each of the casino patrons.

11. The casino patron engagement system of claim 8, wherein the server is further configured to receive data regarding each patron engagement task rendered for each of the casino patrons.

12. The casino patron engagement system of claim 8, wherein the server is further configured to receive patron feedback from each casino patron via an electronic gaming machine.

13. The casino patron engagement system of claim 8, wherein the server is further configured to receive patron feedback from each casino patron via the casino patron mobile device for said casino patron.

14. A casino patron engagement system comprising:

a server configured to securely communicate with a casino employee mobile device, wherein the casino employee mobile device is loaded with an employee application and configured to search for a casino patron mobile profile beacon that is outputted by a casino patron mobile device of a casino patron, and wherein the casino patron mobile device is loaded with a casino mobile patron profile application and configured to automatically output the casino patron mobile profile beacon including broadcast packets receivable and identifiable by the casino employee mobile device;

the server further configured to receive from the casino employee mobile device profile ID data that is obtained by the casino employee mobile device as a result of detecting the casino patron mobile profile beacon outputted by the casino patron mobile device;

the server further configured to send to the casino employee mobile device patron profile data associated with the profile ID data, wherein the patron profile data enables the employee application to cause a display device of the casino employee mobile device to display:

a name of the casino patron, patron status for the casino patron, and a patron location indicator representing a current location of the casino patron mobile device; and the server further configured to assign a patron engagement task for the casino patron to a selected casino employee based at least in part on a current location of a casino employee mobile device associated with the selected casino employee.

15. The casino patron engagement system of claim 14, wherein the server is further configured to assign a higher priority to the casino patron than another patron.

16. The casino patron engagement system of claim 14, wherein the server is further configured to track data regarding a casino employee interaction with the casino patron.

17. The casino patron engagement system of claim 14, wherein the server is further configured to receive data regarding a casino employee service rendered for the casino patron.

18. The casino patron engagement system of claim 14, wherein the server is further configured to receive data generated from a casino employee input of data for adding to the patron profile data.

19. The casino patron engagement system of claim 14, wherein the server is further configured to receive patron feedback from an electronic gaming machine.

20. The casino patron engagement system of claim 14, wherein the server is further configured to receive patron feedback from the casino patron mobile device.

* * * * *